(12) United States Patent
Rajan

(10) Patent No.: US 7,035,790 B2
(45) Date of Patent: Apr. 25, 2006

(54) SPEECH PROCESSING SYSTEM

(75) Inventor: Jebu Jacob Rajan, Bracknell (GB)

(73) Assignee: Canon Kabushiki Kaisha, Tokyo (JP)

( * ) Notice: Subject to any disclaimer, the term of this patent is extended or adjusted under 35 U.S.C. 154(b) by 458 days.

(21) Appl. No.: 09/866,596

(22) Filed: May 30, 2001

(65) Prior Publication Data

US 2002/0059065 A1 May 16, 2002

(30) Foreign Application Priority Data

Jun. 2, 2000 (GB) .................................... 0013541
Aug. 2, 2000 (GB) .................................... 0018965

(51) Int. Cl.
*G10L 19/00* (2006.01)

(52) U.S. Cl. ...................... 704/201; 704/226; 704/216; 704/217

(58) Field of Classification Search ................ 704/231, 704/251, 233, 226–227, 224, 256, 201, 216–218; 702/191; 381/94.2; 382/173
See application file for complete search history.

(56) References Cited

U.S. PATENT DOCUMENTS

| | | | |
|---|---|---|---|
| 4,386,237 A | 5/1983 | Virupaksha et al. | 179/15.55 R |
| 4,811,399 A | 3/1989 | Landell et al. | 381/43 |
| 4,860,360 A * | 8/1989 | Boggs | 704/233 |
| 4,905,286 A | 2/1990 | Sedgwick et al. | 381/43 |
| 5,012,518 A | 4/1991 | Liu et al. | 381/42 |
| 5,315,538 A | 5/1994 | Borrell et al. | 364/574 |
| 5,325,397 A | 6/1994 | Scholz et al. | 375/10 |
| 5,432,859 A | 7/1995 | Yang et al. | 381/94 |
| 5,432,884 A | 7/1995 | Kapanen et al. | 395/2.37 |
| 5,507,037 A | 4/1996 | Bartkowiak et al. | 455/296 |
| 5,611,019 A * | 3/1997 | Nakatoh et al. | 704/233 |
| 5,742,694 A * | 4/1998 | Eatwell | 381/94.2 |
| 5,784,297 A | 7/1998 | O'Brien, Jr. et al. | 364/554 |
| 5,799,276 A * | 8/1998 | Komissarchik et al. | 704/251 |
| 5,884,255 A * | 3/1999 | Cox | 704/233 |

(Continued)

FOREIGN PATENT DOCUMENTS

EP  0 554 083 A2  8/1993

(Continued)

OTHER PUBLICATIONS

Numerical Recipes in C by W. Press, et al., Chapter 7, Cambridge University Press (1992).

(Continued)

*Primary Examiner*—Susan McFadden
*Assistant Examiner*—Huyen X. Vo
(74) *Attorney, Agent, or Firm*—Fitzpatrick, Cella, Harper & Scinto

(57) ABSTRACT

A speech processing system is provided which is operable to receive sets of signal values representative of a speech signal generated by a speech source as distorted by a transmission channel between the speech source and the speech processing system. The system stores data defining a predetermined function derived from a signal model which models both the speech source and the channel and defining a probability density function which gives, for a given set of model parameters, the probability that the signal model has those model parameters given that the signal model is assumed to have generated the received set of signal values. The system applies a current set of received signal values to the stored probability density function and then draws samples from it using a Gibbs sampler. The system then analyses the samples to determine a set of parameter values representative of the speech signal before it was distorted by the channel.

72 Claims, 13 Drawing Sheets

U.S. PATENT DOCUMENTS

| | | | | |
|---|---|---|---|---|
| 5,884,269 | A | 3/1999 | Cellier et al. | 704/501 |
| 5,963,901 | A | 10/1999 | Vähätalo et al. | 704/233 |
| 6,018,317 | A | 1/2000 | Dogan et al. | 342/378 |
| 6,044,336 | A | 3/2000 | Marmarelis et al. | 702/190 |
| 6,134,518 | A | 10/2000 | Cohen et al. | 704/201 |
| 6,157,909 | A | 12/2000 | Mauuary et al. | 704/228 |
| 6,215,831 | B1 | 4/2001 | Nowack et al. | 375/340 |
| 6,226,613 | B1 | 5/2001 | Turin | 704/256 |
| 6,266,633 | B1* | 7/2001 | Higgins et al. | 704/224 |
| 6,324,502 | B1* | 11/2001 | Handel et al. | 704/226 |
| 6,374,221 | B1* | 4/2002 | Haimi-Cohen | 704/256 |
| 6,377,919 | B1* | 4/2002 | Burnett et al. | 704/231 |
| 6,438,513 | B1* | 8/2002 | Pastor et al. | 702/191 |
| 6,516,090 | B1* | 2/2003 | Lennon et al. | 382/173 |
| 6,546,515 | B1 | 4/2003 | Vary et al. | 714/746 |
| 6,549,854 | B1 | 4/2003 | Malinverno et al. | 702/16 |
| 6,708,146 | B1* | 3/2004 | Sewall et al. | 704/217 |
| 6,760,699 | B1 | 7/2004 | Weerackody et al. | 704/233 |

FOREIGN PATENT DOCUMENTS

| | | |
|---|---|---|
| EP | 0 631 402 A2 | 12/1994 |
| EP | 0 674 306 A2 | 9/1995 |
| EP | 0 952 589 A2 | 10/1999 |
| EP | 0 996 112 A2 | 4/2000 |
| EP | 1 022 583 A2 | 7/2000 |
| EP | 1 160 768 A2 | 12/2001 |
| EP | 1 034 441 B1 | 4/2003 |
| GB | 2 137 052 A | 9/1984 |
| GB | 2 332 054 A | 6/1999 |
| GB | 2 332 055 A | 6/1999 |
| GB | 2 345 967 A | 7/2000 |
| GB | 2 349 717 A | 11/2000 |
| GB | 2 356 106 A | 5/2001 |
| GB | 2 356 107 A | 5/2001 |
| GB | 2 356 313 A | 5/2001 |
| GB | 2 356 314 A | 5/2001 |
| GB | 2 360 670 A | 9/2001 |
| GB | 2 361 339 A | 10/2001 |
| GB | 2 363 557 A | 12/2001 |
| JP | 2001/044926 | 2/2001 |
| WO | WO 92/22891 | 12/1992 |
| WO | WO 98/38631 | 9/1998 |
| WO | WO 99/28760 | 6/1999 |
| WO | WO 99/28761 | 6/1999 |
| WO | WO 99/64887 | 12/1999 |
| WO | WO 00/11650 | 3/2000 |
| WO | WO 00/38179 | 6/2000 |
| WO | WO 00/45375 | 8/2000 |
| WO | WO 00/54168 | 9/2000 |

OTHER PUBLICATIONS

"Reversible jump Markov chain Monte Carlo Computation and Bayesian model determination" by Peter Green, Biometrika, vol. 82, pp. 711-732 (1995).

"The Simulation Smoother For Time Series Models", Biometrika, vol. 82, 2, pp. 339-350 (1995).

"Probabilistic inference using Markov chain Monte Carlo methods" by R. Neal. Technical Report CRG-TR-93-1, Department of Computer Science, University of Toronto (1993).

"Fundamentals of Speech Recognition," Rabiner, et al., Prentice Hall, Englewood Cliffs, New Jersey, pp. 115 and 116, 1993.

"Bayesian Separation and Recovery of Convolutively Mixed Autoregssive Sources", Godsill, et al., ICASSP, Mar. 1999.

"Statistical Properties of STFT Ratios for Two Channel Systems and Application to Blind Source Separation", Balan, et al., IEEE Proc.-Vis. Image Signal Process., vol. 44, No. 4, Aug. 1997, pp. 429-434.

Bayesian Approach to Parameter Estimation and Interpolation of Time-Varying Autoregressive Interpolation of Time-Varying Autoregressive Processes Using the Gibbs Sampler, Rajan, et al., IEE Proc.-Vis. Image Signal Process., vol. 44, No. 4, Aug. 1997, pp. 249-256.

"An Introduction to the Kalman Filter", Welch, et al., Dept. of Computer Science, University of North Carolina at Chapel Hill, NC, Sep. 1997.

Srinivasan, et al., "Query Expansion for Imperfect Speech: Applications in Distributed Learning," Proc. IEEE Workshop on Content-Based Access of Image and Video Libraries, 2000, pp. 50-54, no month.

Couvreur, et al., "Wavelet-based Non-Parametric HMM's: Theory and Applications," Proc. International Conference Acoustics, Speech and Signal Processing, Istanbul, vol. 1, Jun. 5-9, 2000, pp. 604-607.

Hopgood, et al., "Bayesian Single Channel Blind Deconvolution Using Parametric Signal and Channel Models," Proc. IEEE Workshop on Applications of Signal Processing to Audio and Acoustics, New Paltz, NY, Oct. 17-20, 1999, pp. 151-154.

Andrieu, et al., "Bayesian Blind Marginal Separation of Convolutively Mixed Discrete Sources," IEEE Proc., 1998, pp. 43-52, no month.

Numerical Recipes in C by W. Press, et al., Chapter 7, Cambridge University Press (1992), no month.

"Reversible jump Markov chain Monte Carlo Computation and Bayesian model determination" by Peter Green, Biometrika, vol. 82, pp. 711-732 (1995), no month.

"The Simulation Smoother For Time Series Models", Biometrika, vol. 82, 2, pp. 339-350 (1995), no month.

"Probabilistic inference using Markov chain Monte Carlo methods" by R. Neal. Technical Report CRG-TR-93-1, Department of Computer Science, University of Toronto (1993), no month.

"Fundamentals of Speech Recognition," Rabiner, et al., Prentice Hall, Englewood Cliffs, New Jersey, pp. 115 and 116, 1993, no month.

"Bayesian Separation and Recovery of Convolutively Mixed Autoregssive Sources", Godsill, et al., ICASSP, Mar. 1999.

"Statistical Properties of STFT Ratios for Two Channel Systems and Application to Blind Source Separation", Balan, et al., IEEE Proc.-Vis. Image Signal Process., vol. 44, No. 4, Aug. 1997, pp. 429-434, no date.

Bayesian Approach to Parameter Estimation and Interpolation of Time-Varying Autoregressive Interpolation of Time-Varying Autoregressive Processes Using the Gibbs Sampler, Rajan, et al., IEE Proc.-Vis. Image Signal Process., vol. 44, No. 4, Aug. 1997, pp. 249-256, no date.

"An Introduction to the Kalman Filter", Welch, et al., Dept. of Computer Science, University of North Carolina at Chapel Hill, NC, Sep. 1997.

* cited by examiner

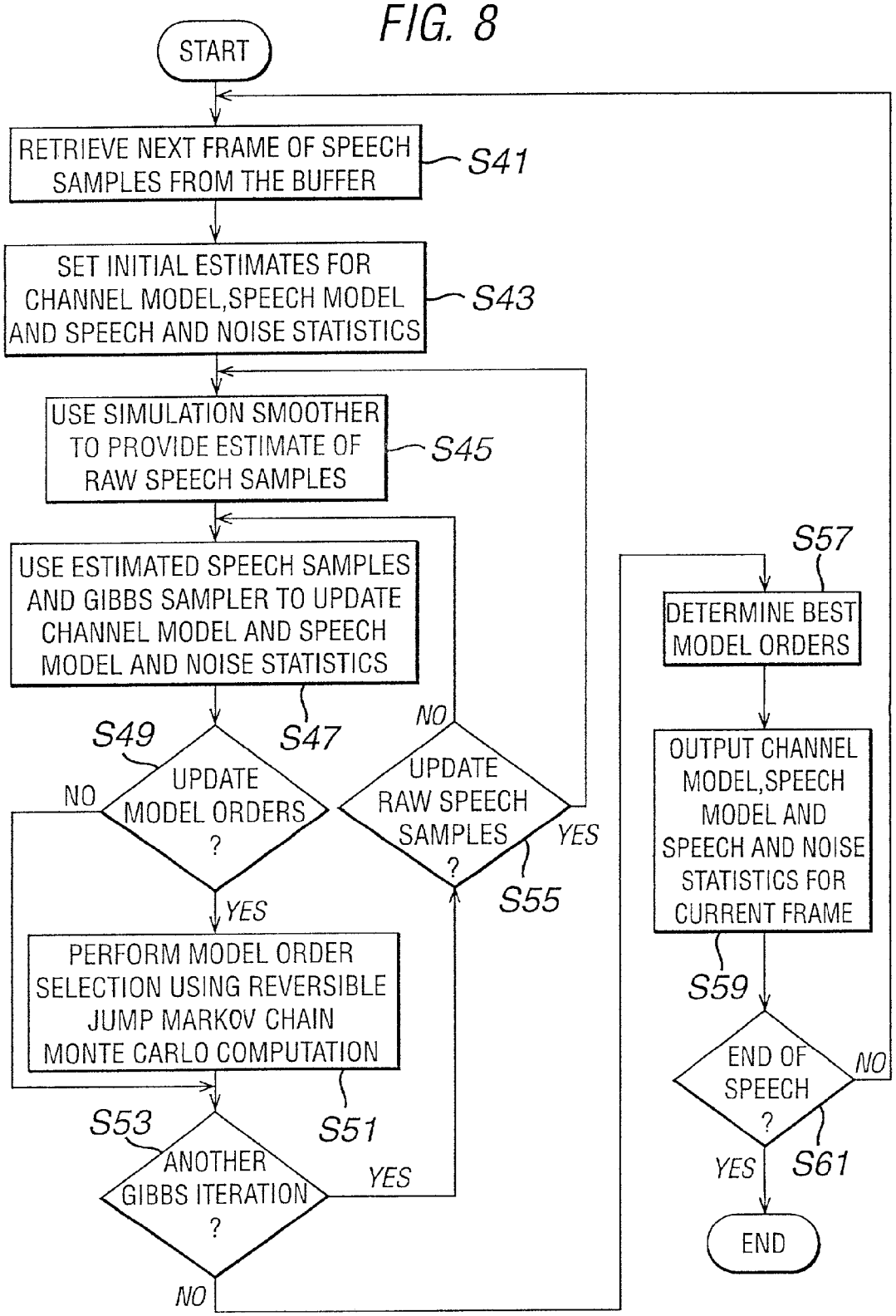

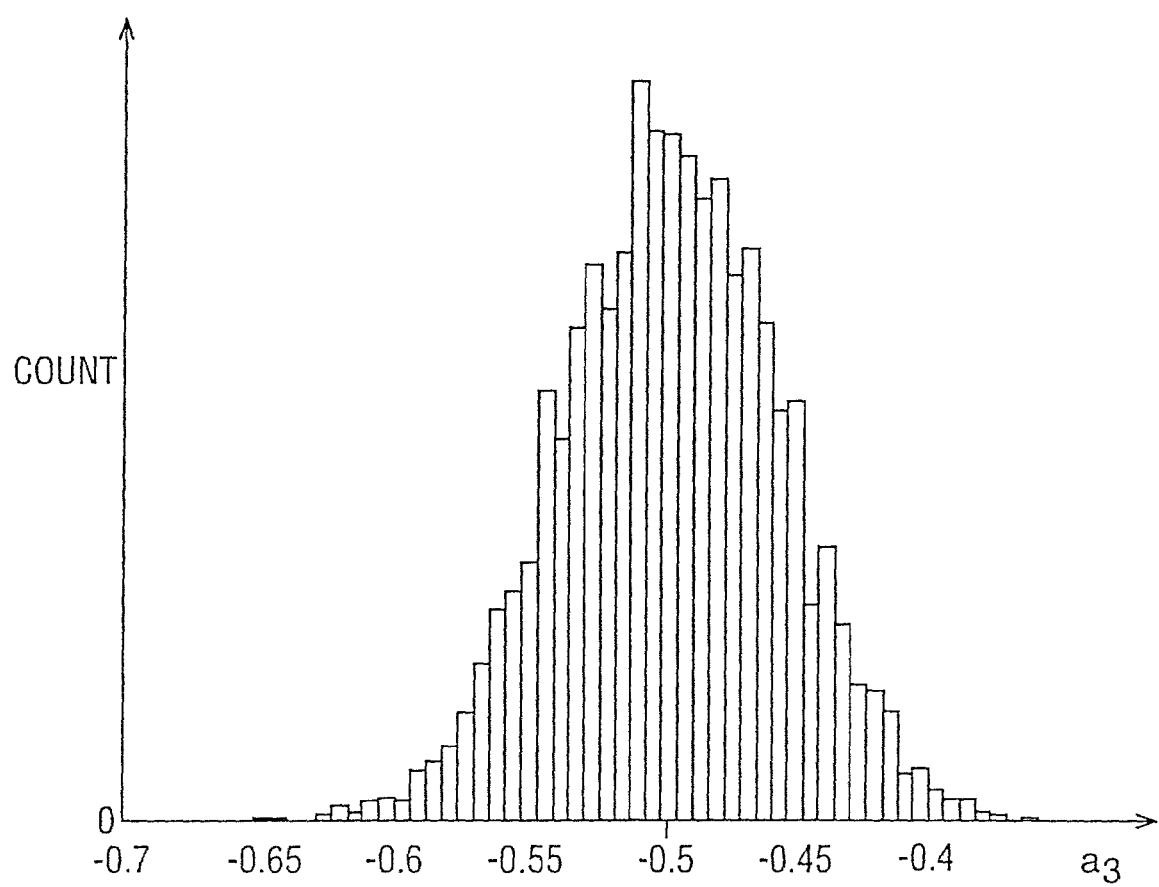

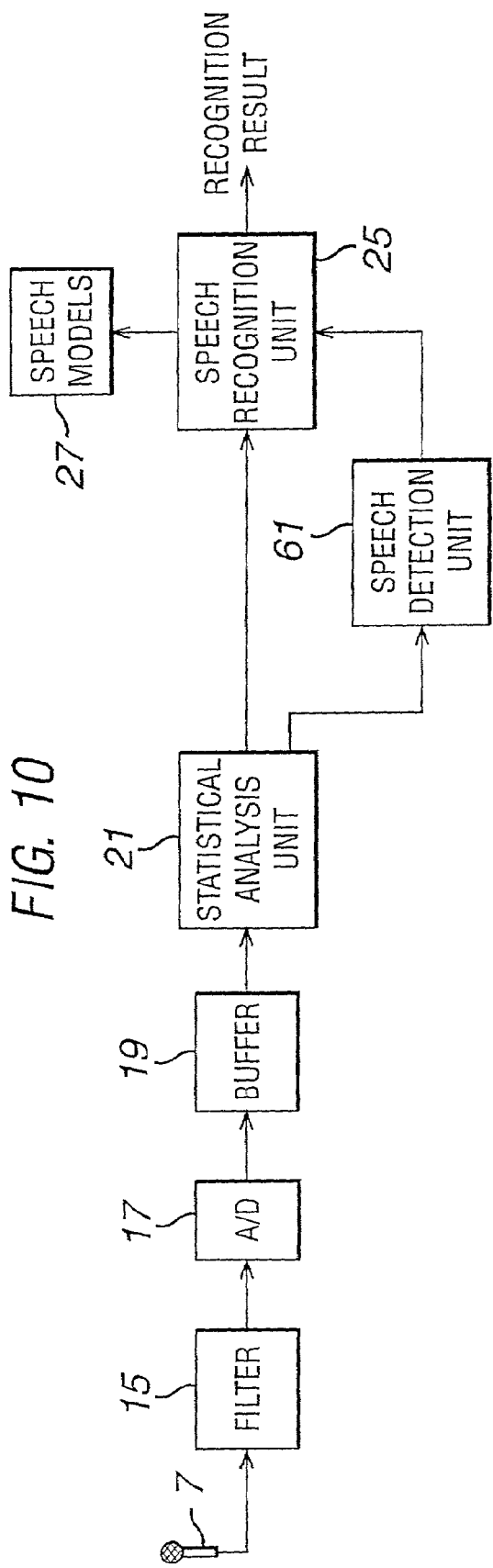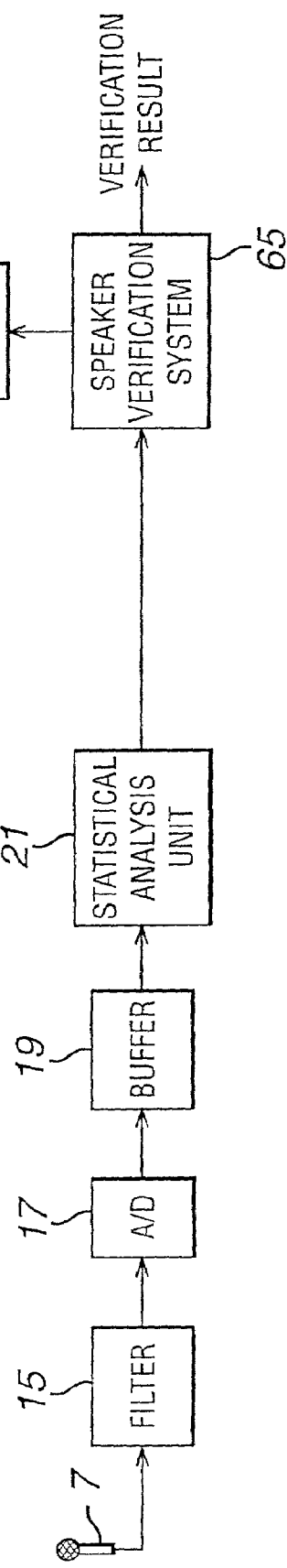

SPEECH PROCESSING SYSTEM

The present invention relates to an apparatus for and method of speech processing. The invention particularly relates to a statistical processing of an input speech signal to derive parameters defining the speech production system which generated the speech.

Most speech processing systems, such as speech recognition systems, speech encoding systems, speaker verification systems and the like all include a signal processing front end, which converts the speech waveform into a parametric representation. One of the most common types of parameters (or coefficients) which are generated to represent speech are linear prediction (LP) coefficients. To represent the entire input speech signal, the speech is divided into a number of time frames (typically having a duration of 10–30 ms) and a set of LP coefficients is calculated to represent the speech within each time frame. This LP analysis assumes that the value of a current speech sample can be predicted from a linear weighted combination of the k most recent speech samples. Based on this model, the task of the LP analysis is to identify the value of the weightings (or coefficients) which minimises the mean squared error between the actual value of the current speech sample and the predicted value of the current speech sample.

One of the problems with this LP analysis is that it performs the analysis of the speech within each frame in isolation from the speech within other frames. It also assumes that the same number of weightings or coefficients will represent the speech within each time frame. As a result, errors can be introduced making subsequent recognition processing or the like more prone to error.

An aim of the present invention is to provide an alternative technique for pre-possessing speech prior to use in a speech recognition system, a speech encoding system, a speaker verification system or the like.

Exemplary embodiments of the present invention will now be described with reference to the accompanying drawings in which:

FIG. 8 is a flow chart illustrating the main processing steps performed by the statistical analysis unit shown in FIG. 6;

FIG. 9c is a histogram for a third coefficient of the AR filter model;

FIG. 10 is a block diagram illustrating the main components of an alternative speech recognition system in which data output by the statistical analysis unit is used to detect the beginning and end of speech within the input signal;

FIG. 11 is a schematic block diagram illustrating the principal components of a speaker verification system;

Embodiments of the present invention can be implemented on computer hardware, but the embodiment to be described is implemented in software which is run in conjunction with processing hardware such as a personal computer, workstation, photocopier, facsimile machine or the like.

Figure 1:
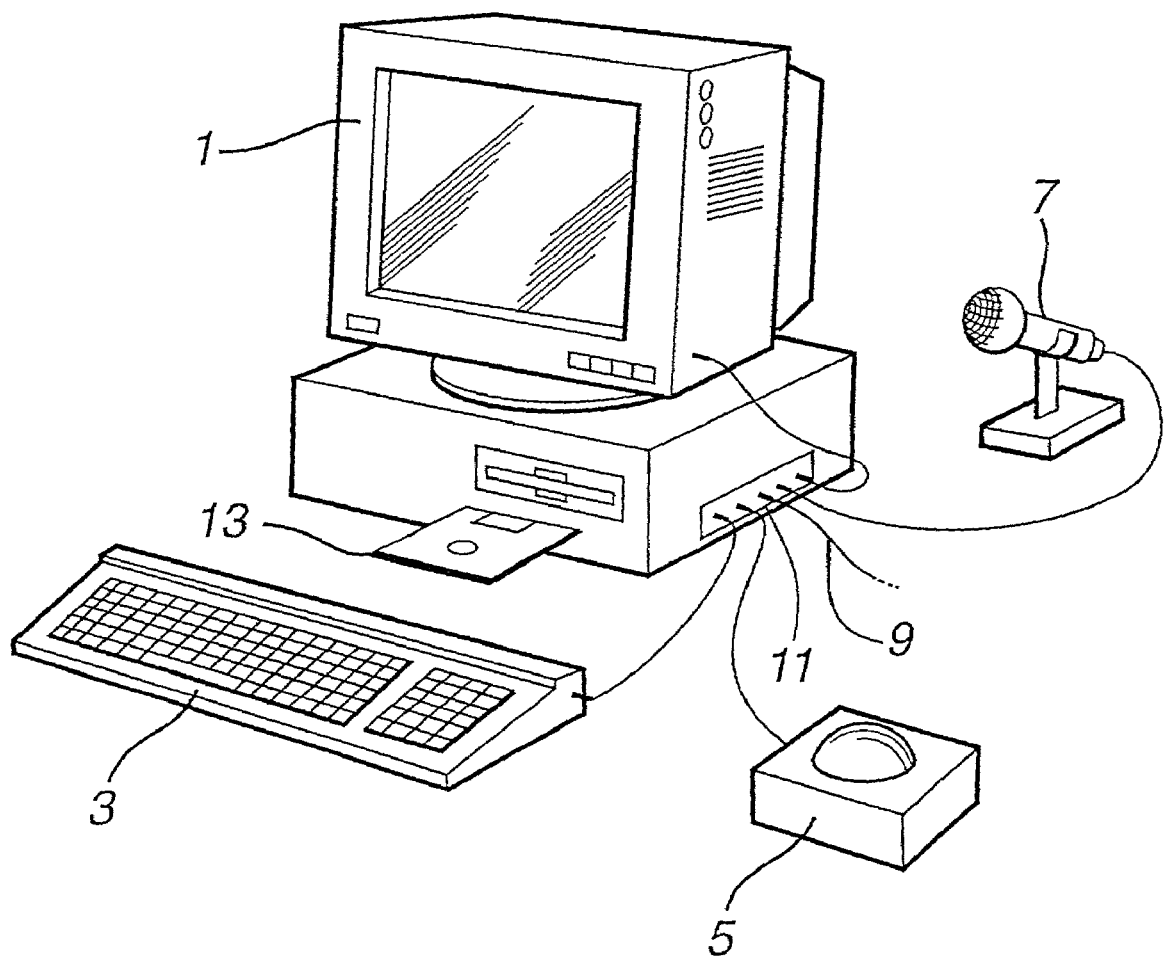
FIG. 1 is a schematic view of a computer which may be programmed to operate in accordance with an embodiment of the present invention.

FIG. 1 shows a personal computer (PC) 1 which may be programmed to operate an embodiment of the present invention. A keyboard 3, a pointing device 5, a microphone 7 and a telephone line 9 are connected to the PC 1 via an interface 11. The keyboard 3 and pointing device 5 allow the system to be controlled by a user. The microphone 7 converts the acoustic speech signal of the user into an equivalent electrical signal and supplies this to the PC 1 for processing. An internal modem and speech receiving circuit (not shown) may be connected to the telephone line 9 so that the PC 1 can communicate with, for example, a remote computer or with a remote user.

The program instructions which make the PC 1 operate in accordance with the present invention may be supplied for use with an existing PC 1 on, for example, a storage device such as a magnetic disc 13, or by downloading the software from the Internet (not shown) via the internal modem and telephone line 9.

The operation of a speech recognition system embodying the present invention will now be described with reference to FIG. 2. Electrical signals representative of the input speech from the microphone 7 are input to a filter 15 which removes unwanted frequencies (in this embodiment frequencies above 8 kHz) within the input signal. The filtered signal is then sampled (at a rate of 16 kHz) and digitised by the analogue to digital converter 17 and the digitised speech samples are then stored in a buffer 19. Sequential blocks (or frames) of speech samples are then passed from the buffer 19 to a statistical analysis unit 21 which performs a statistical analysis of each frame of speech samples in sequence to determine, amongst other things, a set of auto regressive (AR) coefficients representative of the speech within the frame. In this embodiment, the AR coefficients output by the statistical analysis unit 21 are then input, via a coefficient converter 23 to a cepstral based speech recognition unit 25. In this embodiment, therefore, the coefficient converter 23 converts the AR coefficients output by the analysis unit 21 into cepstral coefficients. This can be achieved using the conversion technique described in, for example, "Fundamentals of Speech Recognition" by Rabiner and Juang at pages 115 and 116. The speech recognition unit 25 then compares the cepstral coefficients for successive frames of speech with a set of stored speech models 27, which may be template based or Hidden Markov Model based, to generate a recognition result.

Statistical Analysis Unit—Theory and Overview

As mentioned above, the statistical analysis unit 21 analyses the speech within successive frames of the input speech signal. In most speech processing systems, the frames are overlapping. However, in this embodiment, the frames of speech are non-overlapping and have a duration of 20 ms which, with the 16 kHz sampling rate of the analogue to digital converter 17, results in a frame size of 320 samples.

Figure 3:
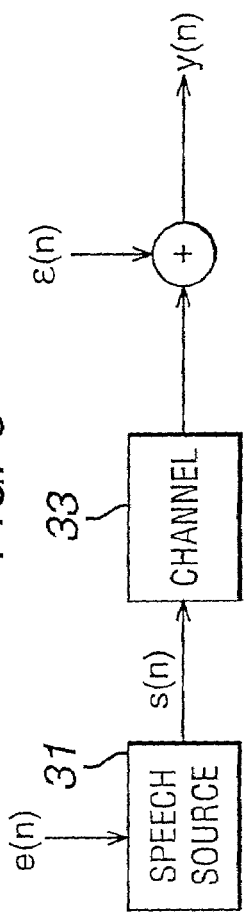
FIG. 3 is a block diagram representing a model employed by a statistical analysis unit which forms part of the speech recognition system shown in FIG. 2.

In order to perform the statistical analysis on each of the frames, the analysis unit 21 assumes that there is an underlying process which generated each sample within the frame. The model of this process used in this embodiment is shown in FIG. 3. As shown, the process is modelled by a speech source 31 which generates, at time t=n, a raw speech sample s(n). Since there are physical constraints on the movement of the speech articulators, there is some correlation between neighbouring speech samples. Therefore, in this embodiment, the speech source 31 is modelled by an auto regressive (AR) process. In other words, the statistical analysis unit 21 assumes that a current raw speech sample (s(n)) can be determined from a linear weighted combination of the most recent previous raw speech samples, i.e.:

$$s(n)=a_1 s(n-1)+a_2 s(n-2)+\ldots+a_k s(n-k)+e(n) \quad (1)$$

where $a_1, a_2 \ldots a_k$ are the AR filter coefficients representing the amount of correlation between the speech samples; k is the AR filter model order; and e(n) represents random process noise which is involved in the generation of the raw speech samples. As those skilled in the art of speech processing will appreciate, these AR filter coefficients are the same coefficients that the linear prediction (LP) analysis estimates albeit using a different processing technique.

As shown in FIG. 3, the raw speech samples s(n) generated by the speech source are input to a channel 33 which models the acoustic environment between the speech source 31 and the output of the analogue to digital converter 17. Ideally, the channel 33 should simply attenuate the speech as it travels from the source 31 to the microphone 7. However, due to reverberation and other distortive effects, the signal (y(n)) output by the analogue to digital converter 17 will depend not only on the current raw speech sample (s(n)) but it will also depend upon previous raw speech samples. Therefore, in this embodiment, the statistical analysis unit 21 models the channel 33 by a moving average (MA) filter, i.e.:

$$y(n)=h_0 s(n)+h_1 s(n-1)+h_2 s(n-2)+\ldots+h_r s(n-r)+\epsilon(n) \quad (2)$$

where y(n) represents the signal sample output by the analogue to digital converter 17 at time t=n; $h_0, h_1, h_2 \ldots h_r$ are the channel filter coefficients representing the amount of distortion within the channel 33; r is the channel filter model order; and $\epsilon(n)$ represents a random additive measurement noise component.

For the current frame of speech being processed, the filter coefficients for both the speech source and the channel are assumed to be constant but unknown. Therefore, considering all N samples (where N=320) in the current frame being processed gives:

$$s(n)=a_1 s(n-1)+a_2 s(n-2)+\ldots+a_k s(n-k)+e(n)$$

$$s(n-1)=a_1 s(n-2)+a_2 s(n-3)+\ldots+a_k s(n-k-1)+e(n-1)$$

$$s(n-N+1)=a_1 s(n-N)+a_2 s(n-N-1)+\ldots+a_k s(n-k-N+1)+e(n-N+1) \quad (3)$$

which can be written in vector form as:

$$\underline{s}(n)=S.\underline{a}+\underline{e}(n) \quad (4)$$

where $$S = \begin{bmatrix} s(n-1) & s(n-2) & s(n-3) & \cdots & s(n-k) \\ s(n-2) & s(n-3) & s(n-4) & \cdots & s(n-k-1) \\ s(n-3) & s(n-4) & s(n-5) & \cdots & s(n-k-2) \\ \vdots & & & \ddots & \\ s(n-N) & s(n-N-1) & s(n-N-2) & \cdots & s(n-k-N+1) \end{bmatrix}_{N \times k} \text{ and}$$

$$\underline{a} = \begin{bmatrix} a_1 \\ a_2 \\ a_3 \\ \vdots \\ a_k \end{bmatrix}_{k \times 1} \quad \underline{s}(n) = \begin{bmatrix} s(n) \\ s(n-1) \\ s(n-2) \\ \vdots \\ s(n-N+1) \end{bmatrix}_{N \times 1} \quad \underline{e}(n) = \begin{bmatrix} e(n) \\ e(n-1) \\ e(n-2) \\ \vdots \\ e(n-N+1) \end{bmatrix}_{N \times 1}$$

As will be apparent from the following discussion, it is also convenient to rewrite equation (3) in terms of the random error component (often referred to as the residual) e(n). This gives:

$$e(n)=s(n)-a_1 s(n-1)-a_2 s(n-2)-\ldots-a_k s(n-k-1)$$

$$e(n-1)=s(n-1)-a_1 s(n-2)-a_2 s(n-3)-\ldots-a_k s(n-k-1)$$

$$e(n-N+1)=s(n-N+1)-a_1 s(n-N)-a_2 s(n-N-1)-\ldots-a_k s(n-k-N1) \quad (5)$$

which can be written in vector notation as:

$$\underline{e}(n)=\ddot{A}\underline{s}(n) \quad (6)$$

where $$\ddot{A} = \begin{bmatrix} 1 & -a_1 & -a_2 & -a_3 & \cdots & -a_k & 0 & 0 & 0 & \cdots & 0 \\ 0 & 1 & -a_1 & -a_2 & \cdots & -a_{k-1} & -a_k & 0 & 0 & \cdots & 0 \\ 0 & 0 & 1 & -a_1 & \cdots & -a_{k-2} & -a_{k-1} & -a_k & 0 & \cdots & 0 \\ \vdots & & & & \ddots & & & & & & \\ 0 & & & & & & & & & & 1 \end{bmatrix}_{N \times N}$$

Similarly, considering the channel model defined by equation (2), with $h_0=1$ (since this provides a more stable solution), gives:

$$q(n)=h_1 s(n-1)+h_2 s(n-2)+\ldots+h_r s(n-r)+\epsilon(n)$$

$$q(n-1)=h_1 s(n-2)+h_2 s(n-3)+\ldots+h_r s(n-r-1)+\epsilon(n-1)$$

$$q(n-N+1)=h_1 s(n-N)+h_2 s(n-N-1)+\ldots+h_r s(n-r-N+1)+\epsilon(n-N+1) \quad (7)$$

(where q(n)=y(n)−s(n)) which can be written in vector form as:

$$\underline{q}(n)=Y.\underline{h}+\underline{\epsilon}(n) \quad (8)$$

where $$Y = \begin{bmatrix} s(n-1) & s(n-2) & s(n-3) & \cdots & s(n-r) \\ s(n-2) & s(n-3) & s(n-4) & \cdots & s(n-r-1) \\ s(n-3) & s(n-4) & s(n-5) & \cdots & s(n-r-2) \\ \vdots & & & \ddots & \\ s(n-N) & s(n-N-1) & s(n-N-2) & \cdots & s(n-r-N+1) \end{bmatrix}_{N \times r} \text{ and}$$

$$\underline{h} = \begin{bmatrix} h_1 \\ h_2 \\ h_3 \\ \vdots \\ h_r \end{bmatrix}_{r \times 1} \quad \underline{q}(n) = \begin{bmatrix} q(n) \\ q(n-1) \\ q(n-2) \\ \vdots \\ q(n-N+1) \end{bmatrix}_{N \times 1} \quad \underline{\varepsilon}(n) = \begin{bmatrix} \varepsilon(n) \\ \varepsilon(n-1) \\ \varepsilon(n-2) \\ \vdots \\ \varepsilon(n-N+1) \end{bmatrix}_{N \times 1}$$

In this embodiment, the analysis unit 21 aims to determine, amongst other things, values for the AR filter coefficients ($\underline{a}$) which best represent the observed signal samples ($\underline{y}(n)$) in the current frame. It does this by determining the AR filter coefficients ($\underline{a}$) that maximise the joint probability density function of the speech model, channel model, raw speech samples and the noise statistics given the observed signal samples output from the analogue to digital converter 17, i.e. by determining:

$$\max_{\underline{a}} \{p(\underline{a}, k, \underline{h}, r, \sigma_e^2, \sigma_\epsilon^2, \underline{s}(n) \mid \underline{y}(n))\} \quad (9)$$

where $\sigma_e^2$ and $\sigma_\epsilon^2$ represent the process and measurement noise statistics respectively. As those skilled in the art will appreciate, this function defines the probability that a particular speech model, channel model, raw speech samples and noise statistics generated the observed frame of speech samples ($\underline{y}(n)$) from the analogue to digital converter. To do this, the statistical analysis unit 21 must determine what this function looks like. This problem can be simplified by rearranging this probability density function using Bayes law to give:

$$\frac{p(\underline{y}(n) \mid \underline{s}(n), \underline{h}, r, \sigma_\epsilon^2) p(\underline{s}(n) \mid \underline{a}, k, \sigma_e^2)}{p(\underline{a} \mid k) p(\underline{h} \mid r) p(\sigma_\epsilon^2) p(\sigma_e^2) p(k) p(r)} \quad (10)$$

$$\frac{p(\underline{a} \mid k) p(\underline{h} \mid r) p(\sigma_\epsilon^2) p(\sigma_e^2) p(k) p(r)}{p(\underline{y}(n))}$$

As those skilled in the art will appreciate, the denominator of equation (10) can be ignored since the probability of the signals from the analogue to digital converter is constant for all choices of model. Therefore, the AR filter coefficients that maximise the function defined by equation (9) will also maximise the numerator of equation (10).

Each of the terms on the numerator of equation (10) will now be considered in turn.

$p(\underline{s}(n) \mid \underline{a}, k, \sigma_e^2)$

This term represents the joint probability density function for generating the vector of raw speech samples ($\underline{s}(n)$) during a frame, given the AR filter coefficients ($\underline{a}$), the AR filter model order (k) and the process noise statistics ($\sigma_e^2$). From equation (6) above, this joint probability density function for the raw speech samples can be determined from the joint probability density function for the process noise.

In particular $p(\underline{s}(n) \mid \underline{a}, k, \sigma_e^2)$ is given by:

$$p(\underline{s}(n) \mid \underline{a}, k\sigma_e^2) = p(\underline{e}(n)) \left| \frac{\partial \underline{e}(n)}{\partial \underline{s}(n)} \right|_{\underline{e}(n) = \underline{s}(n) - S\underline{a}} \quad (11)$$

where $p(\underline{e}(n))$ is the joint probability density function for the process noise during a frame of the input speech and the second term on the right-hand side is known as the Jacobean of the transformation. In this case, the Jacobean is unity because of the triangular form of the matrix Ä (see equations (6) above).

In this embodiment, the statistical analysis unit 21 assumes that the process noise associated with the speech source 31 is Gaussian having zero mean and some unknown variance $\sigma_e^2$. The statistical analysis unit 21 also assumes that the process noise at one time point is independent of the process noise at another time point. Therefore, the joint probability density function for the process noise during a frame of the input speech (which defines the probability of any given vector of process noise $\underline{e}(n)$ occurring) is given by:

$$p(\underline{e}(n)) = (2\pi\sigma_e^2)^{-\frac{N}{2}} \exp\left[\frac{-\underline{e}(n)^T \underline{e}(n)}{2\sigma_e^2}\right] \quad (12)$$

Therefore, the joint probability density function for a vector of raw speech samples given the AR filter coefficients ($\underline{a}$), the AR filter model order (k) and the process noise variance ($\sigma_e^2$) is given by:

$$p(\underline{s}(n) \mid \underline{a}, k, \sigma_e^2) = \quad (13)$$

$$(2\pi\sigma_e^2)^{-\frac{N}{2}} \exp\left[\frac{-1}{2\sigma_e^2} (\underline{s}(n)^T \underline{s}(n) - 2\underline{a}^T S \underline{s}(n) + \underline{a}^T S^T S \underline{a})\right]$$

$p(\underline{y}(n) \mid \underline{s}(n), \underline{h}, r, \sigma_\epsilon^2)$ This term represents the joint probability density function for generating the vector of speech samples ($\underline{y}(n)$) output from the analogue to digital converter 17, given the vector of raw speech samples ($\underline{s}(n)$), the channel filter coefficients ($\underline{h}$), the channel filter model order (r) and the measurement noise statistics ($\sigma_\epsilon^2$). From equation (8), this joint probability density function can be determined from the joint probability density function for the process noise. In particular, $p(\underline{y}(n) \mid \underline{s}(n), \underline{h}, r, \sigma_\epsilon^2)$ is given by:

$$p(\underline{y}(n) \mid \underline{s}(n), \underline{h}, r, \sigma_\epsilon^2) = p(\underline{\varepsilon}(n)) \left| \frac{\delta \underline{\varepsilon}(n)}{\delta \underline{y}(n)} \right|_{\underline{\varepsilon}(n) = \underline{q}(n) - Y\underline{h}} \quad (14)$$

where $p(\underline{\varepsilon}(n))$ is the joint probability density function for the measurement noise during a frame of the input speech and the second term on the right hand side is the Jacobean of the transformation which again has a value of one.

In this embodiment, the statistical analysis unit 21 assumes that the measurement noise is Gaussian having zero mean and some unknown variance $\sigma_\epsilon^2$. It also assumes that the measurement noise at one time point is independent of the measurement noise at another time point. Therefore, the joint probability density function for the measurement noise in a frame of the input speech will have the same form as the process noise defined in equation (12). Therefore, the joint probability density function for a vector of speech samples ($\underline{y}(n)$) output from the analogue to digital converter 17, given the channel filter coefficients ($\underline{h}$), the channel filter model order (r), the measurement noise statistics ($\sigma_\epsilon^2$) and the raw speech samples ($\underline{s}(n)$) will have the following form:

$$p(\underline{y}(n)|\underline{s}(n), \underline{h}, r, \sigma_\epsilon^2) = \quad (15)$$
$$(2\pi\sigma_\epsilon^2)^{-\frac{N}{2}} \exp\left[\frac{-1}{2\sigma_\epsilon^2}(\underline{q}(n)^T \underline{q}(n) - 2\underline{h}^T Y \underline{q}(n) + \underline{h}^T Y^T Y \underline{h})\right]$$

As those skilled in the art will appreciate, although this joint probability density function for the vector of speech samples ($\underline{y}(n)$) is in terms of the variable $\underline{q}(n)$, this does not matter since $\underline{q}(n)$ is a function of $\underline{y}(n)$ and $\underline{s}(n)$, and $\underline{s}(n)$ is a given variable (ie known) for this probability density function.

p($\underline{a}$|k)

This term defines the prior probability density function for the AR filter coefficients ($\underline{a}$) and it allows the statistical analysis unit 21 to introduce knowledge about what values it expects these coefficients will take. In this embodiment, the statistical analysis unit 21 models this prior probability density function by a Gaussian having an unknown variance ($\sigma_a^2$) and mean vector ($\underline{a}_a$), i.e.:

$$p(\underline{a}|k, \sigma_a^2, \underline{\mu}_a) = (2\pi\sigma_a^2)^{-\frac{N}{2}} \exp\left[\frac{-(\underline{a} - \underline{\mu}_a)^T(\underline{a} - \underline{\mu}_a)}{2\sigma_a^2}\right] \quad (16)$$

By introducing the new variables $\sigma_a^2$ and $\underline{a}_a$, the prior density functions ($p(\sigma_a^2)$ and $p(\underline{a}_a)$) for these variables must be added to the numerator of equation (10) above. Initially, for the first frame of speech being processed the mean vector ($\underline{a}_a$) can be set to zero and for the second and subsequent frames of speech being processed, it can be set to the mean vector obtained during the processing of the previous frame. In this case, $p(\underline{a}_a)$ is just a Dirac delta function located at the current value of $\mu_a$ and can therefore be ignored.

With regard to the prior probability density function for the variance of the AR filter coefficients, the statistical analysis unit 21 could set this equal to some constant to imply that all variances are equally probable. However, this term can be used to introduce knowledge about what the variance of the AR filter coefficients is expected to be. In this embodiment, since variances are always positive, the statistical analysis unit 21 models this variance prior probability density function by an Inverse Gamma function having parameters $\alpha_a$ and $\beta_a$, i.e.:

$$p(\sigma_a^2|\alpha_a, \beta_a) = \frac{(\sigma_a^2)^{-(\alpha_a+1)}}{\beta_a \Gamma(\alpha_a)} \exp\left[\frac{-1}{\sigma_a^2 \beta_a}\right] \quad (17)$$

At the beginning of the speech being processed, the statistical analysis unit 21 will not have much knowledge about the variance of the AR filter coefficients. Therefore, initially, the statistical analysis unit 21 sets the variance $\sigma_a^2$ and the $\alpha$ and $\beta$ parameters of the Inverse Gamma function to ensure that this probability density function is fairly flat and therefore non-informative. However, after the first frame of speech has been processed, these parameters can be set more accurately during the processing of the next frame of speech by using the parameter values calculated during the processing of the previous frame of speech.

p($\underline{h}$|r)

This term represents the prior probability density function for the channel model coefficients ($\underline{h}$) and it allows the statistical analysis unit 21 to introduce knowledge about what values it expects these coefficients to take. As with the prior probability density function for the AR filter coefficients, in this embodiment, this probability density function is modelled by a Gaussian having an unknown variance ($\sigma_h^2$) and mean vector ($\underline{a}_h$), i.e.:

$$p(\underline{h}|r, \sigma_h^2, \underline{\mu}_h) = (2\pi\sigma_h^2)^{-\frac{N}{2}} \exp\left[\frac{-(\underline{h} - \underline{\mu}_h)^T(\underline{h} - \underline{\mu}_h)}{2\sigma_h^2}\right] \quad (18)$$

Again, by introducing these new variables, the prior density functions ($p(\sigma_h)$ and $p(\underline{a}_h)$) must be added to the numerator of equation (10). Again, the mean vector can initially be set to zero and after the first frame of speech has been processed and for all subsequent frames of speech being processed, the mean vector can be set to equal the mean vector obtained during the processing of the previous frame. Therefore, $p(\underline{a}_h)$ is also just a Dirac delta function located at the current value of $\underline{a}_h$ and can be ignored.

With regard to the prior probability density function for the variance of the channel filter coefficients, again, in this embodiment, this is modelled by an Inverse Gamma function having parameters $\alpha_h$d h and $\beta_h$. Again, the variance ($\sigma_h^2$) and the $\alpha$ and $\beta$ parameters of the Inverse Gamma function can be chosen initially so that these densities are non-informative so that they will have little effect on the subsequent processing of the initial frame.

$p(\sigma_e^2)$ and $p(\sigma_\epsilon^2)$

These terms are the prior probability density functions for the process and measurement noise variances and again, these allow the statistical analysis unit 21 to introduce knowledge about what values it expects these noise variances will take. As with the other variances, in this embodiment, the statistical analysis unit 21 models these by an Inverse Gamma function having parameters $\alpha_e$, $\beta_e$ and $\alpha_\epsilon$, $\beta_\epsilon$ respectively. Again, these variances and these Gamma function parameters can be set initially so that they are non-informative and will not appreciably affect the subsequent calculations for the initial frame.

p(k) and p(r)

These terms are the prior probability density functions for the AR filter model order (k) and the channel model order (r) respectively. In this embodiment, these are modelled by a uniform distribution up to some maximum order. In this way, there is no prior bias on the number of coefficients in the models except that they can not exceed these predefined maximums. In this embodiment, the maximum AR filter model order (k) is thirty and the maximum channel model order (r) is one hundred and fifty.

Therefore, inserting the relevant equations into the numerator of equation (10) gives the following joint probability density function which is proportional to $p(\underline{a},k, \underline{h},r,\sigma_a^2,\sigma_h^2,\sigma_e^2,\sigma_\epsilon^2,\underline{s}(n)|\underline{y}(n))$ $$(2\pi\sigma_\varepsilon^2)^{-\frac{N}{2}} \exp\left[\frac{-1}{2\sigma_\varepsilon^2}(\underline{q}(n)^T\underline{q}(n) - 2\underline{h}^TY\underline{q}(n) + \underline{h}^TY^TY\underline{h})\right] \times \quad (19)$$

$$(2\pi\sigma_e^2)^{-\frac{N}{2}} \exp\left[\frac{-1}{2\sigma_e^2}(\underline{s}(n)^T\underline{s}(n) - 2\underline{a}^TS\underline{s}(n) + \underline{a}^TS^TS\underline{a})\right] \times$$

$$(2\pi\sigma_a^2)^{-\frac{N}{2}} \exp\left[\frac{-(\underline{a}-\underline{\mu}_a)^T(\underline{a}-\underline{\mu}_a)}{2\sigma_a^2}\right] \times (2\pi\sigma_h^2)^{-\frac{N}{2}}$$

$$\exp\left[\frac{-(\underline{h}-\underline{\mu}_h)^T(\underline{h}-\underline{\mu}_h)}{2\sigma_h^2}\right] \times \frac{(\sigma_a^2)^{-(\alpha_a+1)}}{\beta_a\Gamma(\alpha_a)}\exp\left[\frac{-1}{\sigma_a^2\beta_a}\right] \times \frac{(\sigma_h^2)^{-(\alpha_h+1)}}{\beta_h\Gamma(\alpha_h)}$$

$$\exp\left[\frac{-1}{\sigma_h^2\beta_h}\right] \times \frac{(\sigma_e^2)^{-(\alpha_e+1)}}{\beta_e\Gamma(\alpha_e)}\exp\left[\frac{-1}{\sigma_e^2\beta_e}\right] \times \frac{(\sigma_\varepsilon^2)^{-(\alpha_\varepsilon+1)}}{\beta_\varepsilon\Gamma(\alpha_\varepsilon)}\exp\left[\frac{-1}{\sigma_\varepsilon^2\beta_\varepsilon}\right]$$

Gibbs Sampler

In order to determine the form of this joint probability density function, the statistical analysis unit 21 "draws samples" from it. In this embodiment, since the joint probability density function to be sampled is a complex multivariate function, a Gibbs sampler is used which breaks down the problem into one of drawing samples from probability density functions of smaller dimensionality. In particular, the Gibbs sampler proceeds by drawing random variates from conditional densities as follows: first iteration $p(\underline{a},k|h^0,r^0,\sigma_e^{2^0},\sigma_\varepsilon^{2^0},\sigma_a^{2^0},\sigma_h^{2^0},\underline{s}(n)^0,\underline{y}(n)) \to \underline{a}^1, k^1$ $p(\underline{h},r|\underline{a}^1,k^1,\sigma_e^{2^0},\sigma_\varepsilon^{2^0},\sigma_a^{2^0},\sigma_h^{2^0},\underline{s}(n)^0,\underline{y}(n)) \to \underline{h}^1, k^1$ $p(\sigma_e^2|\underline{a}^1,k^1,\underline{h}^1,r^1,\sigma_\varepsilon^{2^0},\sigma_a^{2^0},\sigma_h^{2^0},\underline{s}(n)^0,\underline{y}(n)) \to \sigma_e^{2^1}$ $p(\sigma_h^2|\underline{a}^1,k^1,\underline{h}^1,r^1,\sigma_e^{2^1},\sigma_a^{2^1},\sigma_h^{2^1},\underline{s}(n)^0,\underline{y}(n)) \to \sigma_h^{2^1}$ second iteration $p(\underline{a},k|\underline{h}^1,r^1,\sigma_e^{2^1},\sigma_\varepsilon^{2^1},\sigma_h^{2^1},\underline{s}(n)) \to \underline{a}^2, k^2$ $p(\underline{h},r|\underline{a}^2,k^2,\sigma_e^{2^1},\sigma_\varepsilon^{2^1},\sigma_a^{2^1},\sigma_h^{2^1},s(n)^1, y(n)) \to \underline{h}^2, r^2$ etc.

where $(h^0, r^0, (\sigma_e^2)^0, (\sigma_\varepsilon^2)^0, (\sigma_a^2)^0, (\sigma_h^2)^0, \underline{s}(n)^0)$ are initial values which may be obtained from the results of the statistical analysis of the previous frame of speech, or where there are no previous frames, can be set to appropriate values that will be known to those skilled in the art of speech processing.

As those skilled in the art will appreciate, these conditional densities are obtained by inserting the current values for the given (or known) variables into the terms of the density function of equation (19). For the conditional density $p(\underline{a},k|\ldots)$ this results in:

$$p(\underline{a}, k | \ldots) \propto \exp\left[\frac{-1}{2\sigma_e^2}(\underline{s}(n)^T\underline{s}(n) - 2\underline{a}^TS\underline{s}(n) + \underline{a}^TS^TS\underline{a})\right] \times \quad (20)$$

$$\exp\left[\frac{-(\underline{a}-\underline{\mu}_a)^T(\underline{a}-\underline{\mu}_a)}{2\sigma_a^2}\right]$$

which can be simplified to give:

$$p(\underline{a}, k | \ldots) \propto \exp\left[\frac{-1}{2}\left(\frac{\underline{s}(n)^T\underline{s}(n)}{\sigma_e^2} + \frac{\underline{\mu}_a^T\underline{\mu}_a}{\sigma_a^2} - 2\underline{a}^T\left[\frac{S\underline{s}(n)}{\sigma_e^2} + \frac{\underline{\mu}_a}{\sigma_a^2}\right]\right.\right. \quad (21)$$
$$\left.\left.+\underline{a}^T\left[\frac{S^TS}{\sigma_e^2} + \frac{I}{\sigma_a^2}\right]\underline{a}\right)\right]$$

which is in the form of a standard Gaussian distribution having the following covariance matrix:

$$\Sigma_{\underline{a}} = \left[\frac{S^TS}{\sigma_e^2} + \frac{I}{\sigma_a^2}\right]^{-1} \quad (22)$$

The mean value of this Gaussian distribution can be determined by differentiating the exponent of equation (21) with respect to a and determining the value of a which makes the differential of the exponent equal to zero. This yields a mean value of:

$$\hat{\underline{\mu}}_{\underline{a}} = \left[\frac{S^TS}{\sigma_e^2} + \frac{I}{\sigma_a^2}\right]^{-1}\left[\frac{S^T\underline{s}(n)}{\sigma_e^2} + \frac{\underline{\mu}_a}{\sigma_a^2}\right] \quad (23)$$

A sample can then be drawn from this standard Gaussian distribution to give $\underline{a}^g$ (where g is the $g^{th}$ iteration of the Gibbs sampler) with the model order ($k^g$) being determined by a model order selection routine which will be described later. The drawing of a sample from this Gaussian distribution may be done by using a random number generator which generates a vector of random values which are uniformly distributed and then using a transformation of random variables using the covariance matrix and the mean value given in equations (22) and (23) to generate the sample. In this embodiment, however, a random number generator is used which generates random numbers from a Gaussian distribution having zero mean and a variance of one. This simplifies the transformation process to one of a simple scaling using the covariance matrix given in equation (22) and shifting using the mean value given in equation (23). Since the techniques for drawing samples from Gaussian distributions are well known in the art of statistical analysis, a further description of them will not be given here. A more detailed description and explanation can be found in the book entitled "Numerical Recipes in C", by W. Press et al, Cambridge University Press, 1992 and in particular at chapter 7.

As those skilled in the art will appreciate, however, before a sample can be drawn from this Gaussian distribution, estimates of the raw speech samples must be available so that the matrix S and the vector $\underline{s}(n)$ are known. The way in which these estimates of the raw speech samples are obtained in this embodiment will be described later.

A similar analysis for the conditional density $p(\underline{h},r|\ldots)$ reveals that it also is a standard Gaussian distribution but having a covariance matrix and mean value given by:

$$\Sigma_{\underline{h}} = \left[\frac{Y^TY}{\sigma_\varepsilon^2} + \frac{I}{\sigma_h^2}\right]^{-1} \quad \hat{\underline{\mu}}_{\underline{h}} = \left[\frac{Y^TY}{\sigma_\varepsilon^2} + \frac{I}{\sigma_h^2}\right]^{-1}\left[\frac{Y^T\underline{q}(n)}{\sigma_\varepsilon^2} + \frac{\underline{\mu}_h}{\sigma_h^2}\right] \quad (24)$$

from which a sample for $\underline{h}^g$ can be drawn in the manner described above, with the channel model order ($r^g$) being determined using the model order selection routine which will be described later.

A similar analysis for the conditional density $p(\sigma_e^2 | \ldots)$ shows that:

$$p(\sigma_e^2 | \ldots) \propto (\sigma_e^2)^{-\frac{N}{2}} \exp\left[\frac{-E}{2\sigma_e^2}\right] \frac{(\sigma_e^2)^{-(\alpha_e+1)}}{\beta_e \Gamma(\alpha_e)} \exp\left[\frac{-1}{\sigma_e^2 \beta_e}\right] \quad (25)$$

where:

$$E = \underline{s}(n)^T \underline{s}(n) - 2\underline{a}^T S \underline{s}(n) + \underline{a}^T S^T S \underline{a}$$

which can be simplified to give:

$$p(\sigma_e^2 | \ldots) \propto (\sigma_e^2)^{-[(\frac{N}{2}+\alpha_e)+1]} \exp\left[\frac{-1}{\sigma_e^2}\left(\frac{E}{2} + \frac{1}{\beta_e}\right)\right] \quad (26)$$

which is also an Inverse Gamma distribution having the following parameters:

$$\hat{\alpha}_e = \frac{N}{2} + \alpha_e \text{ and } \hat{\beta}_e = \frac{2\beta_e}{2 + \beta_e E} \quad (27)$$

A sample is then drawn from this Inverse Gamma distribution by firstly generating a random number from a uniform distribution and then performing a transformation of random variables using the alpha and beta parameters given in equation (27), to give $(\sigma_e^2)^g$.

A similar analysis for the conditional density $p(\sigma_\epsilon^2 | \ldots)$ reveals that it also is an Inverse Gamma distribution having the following parameters:

$$\hat{\alpha}_\epsilon = \frac{N}{2} + \alpha_\epsilon \text{ and } \hat{\beta}_\epsilon = \frac{2\beta_\epsilon}{2 + \beta_\epsilon E} \quad (28)$$

where:

$$E^* = \underline{q}(n)^T \underline{q}(n) - 2\underline{h}^T Y \underline{q}(n) + \underline{h}^T Y^T Y \underline{h}$$

A sample is then drawn from this Inverse Gamma distribution in the manner described above to give $(\sigma_\epsilon^2)^g$.

A similar analysis for conditional density $p(\sigma_a^2 | \ldots)$ reveals that it too is an Inverse Gamma distribution having the following parameters:

$$\hat{\alpha}_a = \frac{N}{2} + \alpha_a \text{ and } \hat{\beta}_a = \frac{2\beta_a}{2 + \beta_a \cdot (a + \underline{\mu}_a)^T (a - \underline{\mu}_a)} \quad (29)$$

A sample is then drawn from this Inverse Gamma distribution in the manner described above to give $(\sigma_a^2)^g$.

Similarly, the conditional density $p(\sigma_h^2 | \ldots)$ is also an Inverse Gamma distribution but having the following parameters:

$$\hat{\alpha}_h = \frac{N}{2} + \alpha_h \text{ and } \hat{\beta}_h = \frac{2\beta_h}{2 + \beta_h \cdot (a + \underline{\mu}_h)^T (a - \underline{\mu}_h)} \quad (30)$$

A sample is then drawn from this Inverse Gamma distribution in the manner described above to give $(\sigma_h^2)^g$.

As those skilled in the art will appreciate, the Gibbs sampler requires an initial transient period to converge to equilibrium (known as burn-in). Eventually, after L iterations, the sample ($\underline{a}^L$, $k^L$, $\underline{h}^L$, $r^L$, $(\sigma_e^2)^L$, $(\sigma_\epsilon^2)^L$, $(\sigma_a^2)^L$, $(\sigma_h^2)^L$, $s(n)^L$) is considered to be a sample from the joint probability density function defined in equation (19). In this embodiment, the Gibbs sampler performs approximately one hundred and fifty (150) iterations on each frame of input speech and discards the samples from the first fifty iterations and uses the rest to give a picture (a set of histograms) of what the joint probability density function defined in equation (19) looks like. From these histograms, the set of AR coefficients ($\underline{a}$) which best represents the observed speech samples ($\underline{y}(n)$) from the analogue to digital converter 17 are determined. The histograms are also used to determine appropriate values for the variances and channel model coefficients ($\underline{h}$) which can be used as the initial values for the Gibbs sampler when it processes the next frame of speech.

Model Order Selection

As mentioned above, during the Gibbs iterations, the model order (k) of the AR filter and the model order (r) of the channel filter are updated using a model order selection routine. In this embodiment, this is performed using a technique derived from "Reversible jump Markov chain Monte Carlo computation", which is described in the paper entitled "Reversible jump Markov chain Monte Carlo Computation and Bayesian model determination" by Peter Green, Biometrika, vol 82, pp 711 to 732, 1995.

Figure 4:
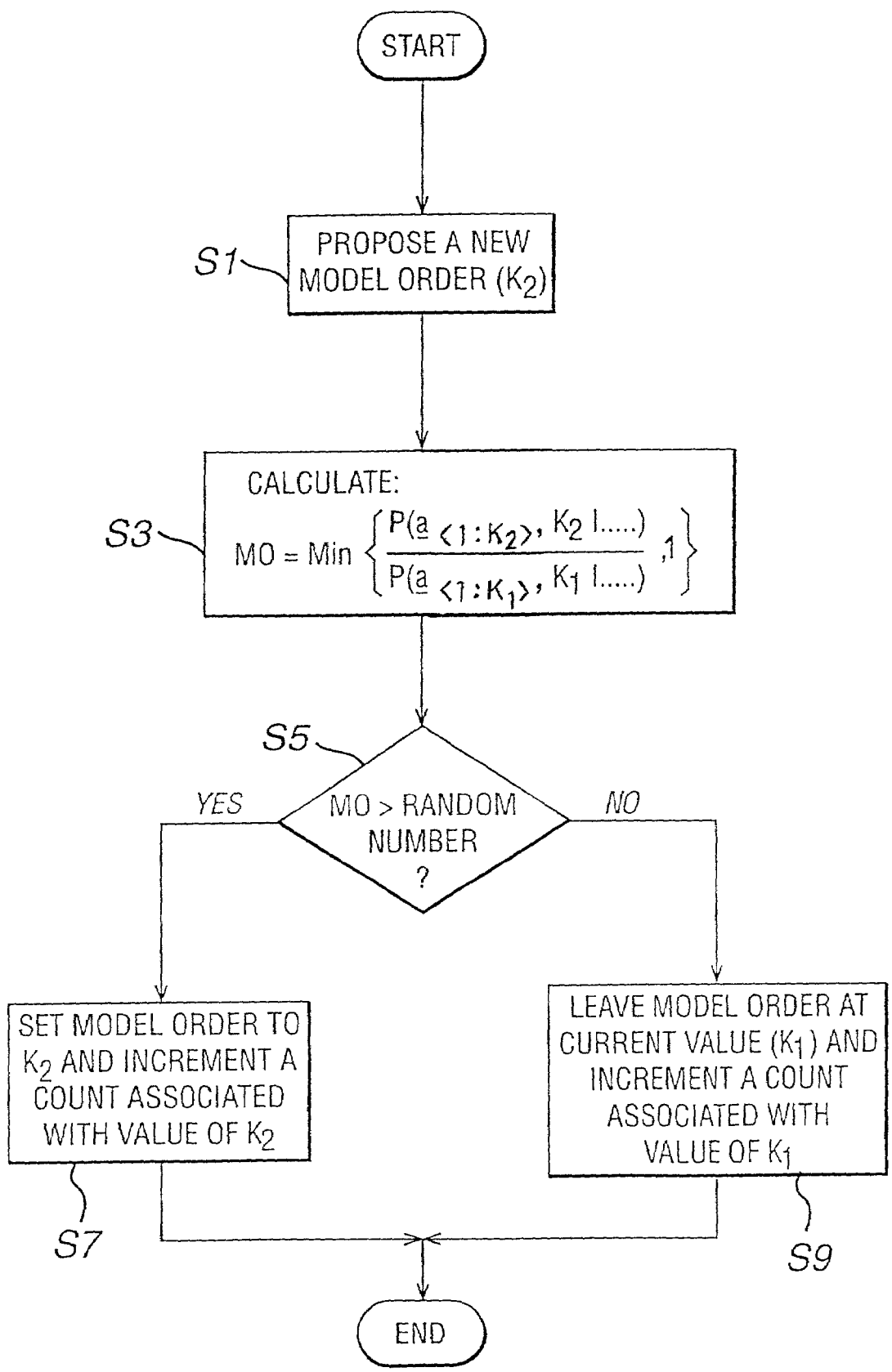
FIG. 4 is a flow chart illustrating the processing steps performed by a model order selection unit forming part of the statistical analysis unit shown in FIG. 2.

FIG. 4 is a flow chart which illustrates the processing steps performed during this model order selection routine for the AR filter model order (k). As shown, in step s1, a new model order ($k_2$) is proposed. In this embodiment, the new model order will normally be proposed as $k_2=k_1\pm1$, but occasionally it will be proposed as $k_2=k_1\pm2$ and very occasionally as $k_2=k_1\pm3$ etc. To achieve this, a sample is drawn from a discretised Laplacian density function centred on the current model order ($k_1$) and with the variance of this Laplacian density function being chosen a priori in accordance with the degree of sampling of the model order space that is required.

The processing then proceeds to step s3 where a model order variable (MO) is set equal to:

$$MO = \max\left\{\frac{p(\underline{a}_{<1:k_2>}, k_2 | \ldots)}{p(\underline{a}_{<1:k_2>}, k_1 | \ldots)}, 1\right\} \quad (31)$$

where the ratio term is the ratio of the conditional probability given in equation (21) evaluated for the current AR filter coefficients ($\underline{a}$) drawn by the Gibbs sampler for the current model order ($k_1$) and for the proposed new model order ($k_2$). If $k_2>k_1$, then the matrix S must first be resized and then a new sample must be drawn from the Gaussian distribution having the mean vector and covariance matrix defined by equations (22) and (23) (determined for the resized matrix S), to provide the AR filter coefficients ($\underline{a}_{<1:k_2>}$) for the new model order ($k_2$). If $k_2<k_1$ then all that is required is to delete the last ($k_1-k_2$) samples from the a vector. If the ratio in equation (31) is greater than one, then this implies that the proposed model order ($k_2$) is better than the current model order whereas if it is less than one then this implies that the current model order is better than the proposed model order. However, since occasionally this will not be the case, rather than deciding whether or not to accept the proposed model order by comparing the model order variable (MO) with a fixed threshold of one, in this embodiment, the model order variable (MO) is compared, in step s5, with a random number which lies between zero and one. If the model order variable (MO) is greater than this random number, then the processing proceeds to step s7 where the model order is set to the proposed model order ($k_2$) and a count associated with the value of $k_2$ is incremented. If, on the other hand, the model order variable (MO) is smaller than the random number, then the processing proceeds to step s9 where the current model order is maintained and a count associated with the value of the current model order ($k_1$) is incremented. The processing then ends.

This model order selection routine is carried out for both the model order of the AR filter model and for the model order of the channel filter model. This routine may be carried out at each Gibbs iteration. However, this is not essential. Therefore, in this embodiment, this model order updating routine is only carried out every third Gibbs iteration.

Simulation Smoother

As mentioned above, in order to be able to draw samples using the Gibbs sampler, estimates of the raw speech samples are required to generate $\underline{s}(n)$, S and Y which are used in the Gibbs calculations. These could be obtained from the conditional probability density function $p(\underline{s}(n)| \ldots )$. However, this is not done in this embodiment because of the high dimensionality of $\underline{S}(n)$. Therefore, in this embodiment, a different technique is used to provide the necessary estimates of the raw speech samples. In particular, in this embodiment, a "Simulation Smoother" is used to provide these estimates. This Simulation Smoother was proposed by Piet de Jong in the paper entitled "The Simulation Smoother for Time Series Models", Biometrika (1995), vol 82,2, pages 339 to 350. As those skilled in the art will appreciate, the Simulation Smoother is run before the Gibbs Sampler. It is also run again during the Gibbs iterations in order to update the estimates of the raw speech samples. In this embodiment, the Simulation Smoother is run every fourth Gibbs iteration.

In order to run the Simulation Smoother, the model equations defined above in equations (4) and (6) must be written in "state space" format as follows:

$$\hat{\underline{s}}(n)=\tilde{A}.\hat{\underline{s}}(n-1)+\hat{\underline{e}}(n)$$

$$y(n)=\underline{h}^T.\hat{\underline{s}}(n-1)+\epsilon(n) \quad (32)$$

where $$\tilde{A} = \begin{bmatrix} a_1 & a_2 & a_3 & \cdots & a_j & 0 & \cdots & 0 \\ 1 & 0 & 0 & \cdots & 0 & 0 & \cdots & 0 \\ 0 & 1 & 0 & \cdots & 0 & 0 & \cdots & 0 \\ \vdots & & & \ddots & & & & \\ 0 & & & & & & 1 & 0 \end{bmatrix}_{r \times r}$$

and $$\hat{\underline{s}}(n) = \begin{bmatrix} \hat{s}(n) \\ \hat{s}(n-1) \\ \hat{s}(n-2) \\ \vdots \\ \hat{s}(n-r+1) \end{bmatrix}_{r \times 1} \quad \hat{\underline{e}}(n) = \begin{bmatrix} \hat{e}(n) \\ 0 \\ 0 \\ \vdots \\ 0 \end{bmatrix}_{r \times 1}$$

With this state space representation, the dimensionality of the raw speech vectors ($\hat{\underline{s}}(n)$) and the process noise vectors ($\hat{\underline{e}}(n)$) do not need to be N×1 but only have to be as large as the greater of the model orders—k and r. Typically, the channel model order (r) will be larger than the AR filter model order (k). Hence, the vector of raw speech samples ($\hat{\underline{s}}(n)$) and the vector of process noise ($\hat{\underline{e}}(n)$) only need to be r×1 and hence the dimensionality of the matrix $\tilde{A}$ only needs to be r×r.

Figure 5:
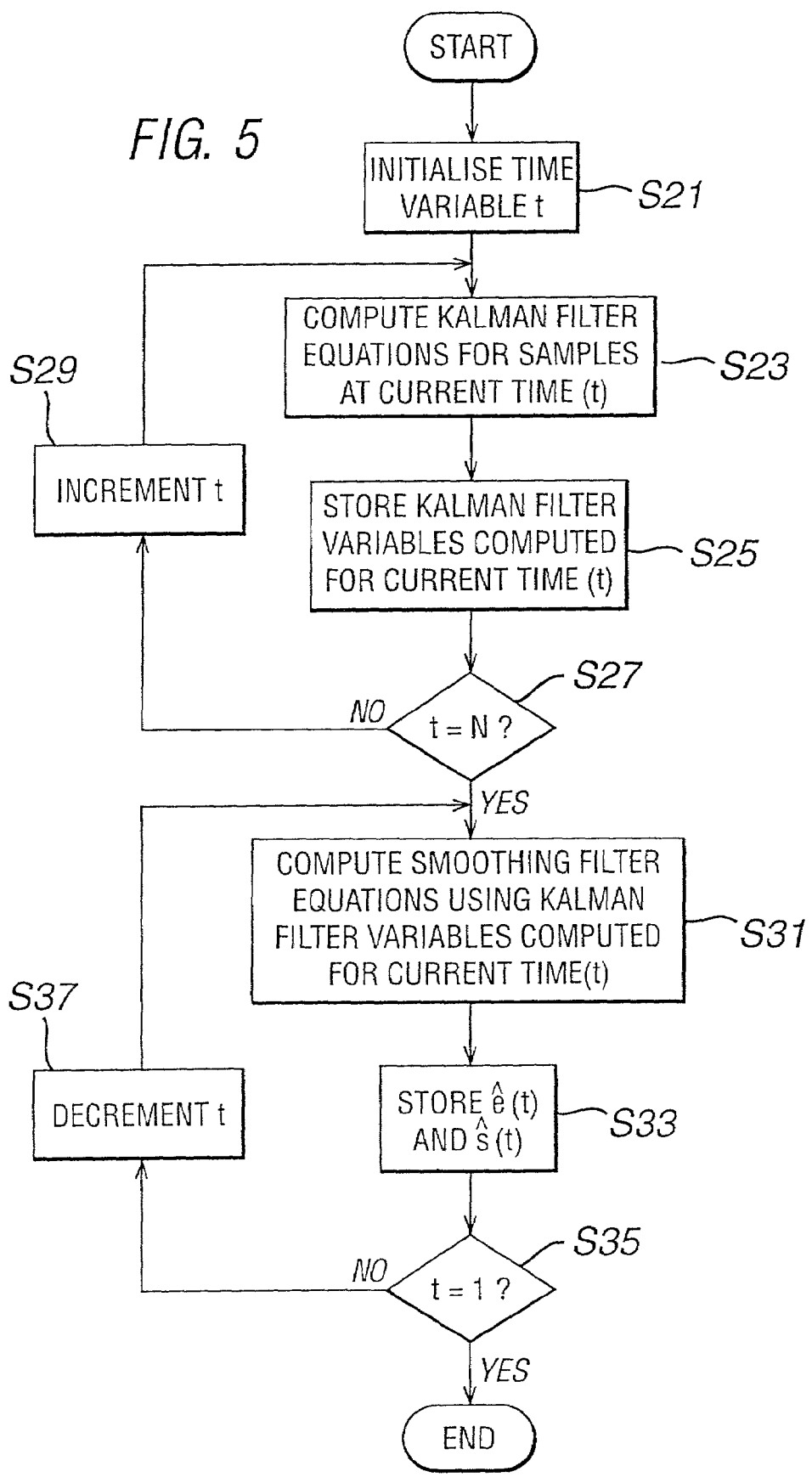
FIG. 5 is a flow chart illustrating the main processing steps employed by a Simulation Smoother which forms part of the statistical analysis unit shown in FIG. 2.

The Simulation Smoother involves two stages—a first stage in which a Kalman filter is run on the speech samples in the current frame and then a second stage in which a "smoothing" filter is run on the speech samples in the current frame using data obtained from the Kalman filter stage. FIG. 5 is a flow chart illustrating the processing steps performed by the Simulation Smoother. As shown, in step s21, the system initialises a time variable t to equal one. During the Kalman filter stage, this time variable is run from t=1 to N in order to process the N speech samples in the current frame being processed in time sequential order. After step s21, the processing then proceeds to step s23, where the following Kalman filter equations are computed for the current speech sample (y(t)) being processed:

$$w(t)=y(t)-\underline{h}^T\hat{\underline{s}}(t)$$

$$d(t)=\underline{h}^TP(t)\underline{h}+\sigma_\epsilon^2$$

$$\underline{k}_f(t)=(\tilde{A}P(t)\underline{h}).d(t)^{-1}$$

$$\hat{\underline{s}}(t+1)=\tilde{A}\hat{\underline{s}}(t)+\underline{k}_f(t)\ w(t)$$

$$L(t)=\tilde{A}-\underline{k}_f(t).\underline{h}^T$$

$$P(t+1)=\tilde{A}P(t)L(t)^T+\sigma_e^2 I \quad (33)$$

where the initial vector of raw speech samples ($\hat{\underline{s}}(1)$) includes raw speech samples obtained from the processing of the previous frame (or if there are no previous frames then s(i) is set equal to zero for i<1); P(1) is the variance of $\hat{\underline{s}}(1)$ (which can be obtained from the previous frame or initially can be set to $\sigma_e^2$); $\underline{h}$ is the current set of channel model coefficients which can be obtained from the processing of the previous frame (or if there are no previous frames then the elements of h can be set to their expected values–zero); y(t) is the current speech sample of the current frame being processed and I is the identity matrix. The processing then proceeds to step s25 where the scalar values w(t) and d(t) are stored together with the r×r matrix L(t) (or alternatively the Kalman filter gain vector $\underline{k}_f(t)$ could be stored from which L(t) can be generated). The processing then proceeds to step s27 where the system determines whether or not all the speech samples in the current frame have been processed. If they have not, then the processing proceeds to step s29 where the time variable t is incremented by one so that the next sample in the current frame will be processed in the same way. Once all N samples in the current frame have been processed in this way and the corresponding values stored, the first stage of the Simulation Smoother is complete.

The processing then proceeds to step s31 where the second stage of the Simulation Smoother is started in which the smoothing filter processes the speech samples in the current frame in reverse sequential order. As shown, in step s31 the system runs the following set of smoothing filter equations on the current speech sample being processed together with the stored Kalman filter variables computed for the current speech sample being processed:

$$C(t) = \sigma_e^2(I - \sigma_e^2 U(t))$$

$$\underline{a}(t) \sim N(0, C(t))$$

$$V(t) = \sigma_e^2 U(t) L(t)$$

$$\underline{r}(t-1) = \underline{h} d(t)^{-1} w(t) + L(t)^T \underline{r}(t) - V(t)^T C(t)^{-1} \underline{a}(t)$$

$$U(t-1) = \underline{h} d(t)^{-1} \underline{h}^T + L(t)^T U(t) L(t) + V(t)^T C(t)^{-1} V(t)$$

$$\underline{\tilde{e}}(t) = \sigma_e^2 \underline{r}(t) + \underline{a}(t) \text{ where } \underline{\tilde{e}}(t) = [\tilde{e}(t)\tilde{e}(t-1)\tilde{e}(t-2) \ldots \tilde{e}(t-r+1)]^T$$

$$\underline{\hat{s}}(t) = \tilde{A}\underline{\hat{s}}(t-1) + \underline{\hat{e}}(t) \text{ where } \underline{\hat{s}}(t) = [\hat{s}(t)\hat{s}(t-1)\hat{s}(t-2) \ldots \hat{s}(t-r+1)]^T \text{ and } \underline{\hat{e}}(t) = [\tilde{e}(t) 0\ 0 \ldots 0]^T \quad (34)$$

where a(t) is a sample drawn from a Gaussian distribution having zero mean and covariance matrix C(t); the initial vector r(t=N) and the initial matrix U(t=N) are both set to zero; and s(0) is obtained from the processing of the previous frame (or if there are no previous frames can be set equal to zero). The processing then proceeds to step s33 where the estimate of the process noise (ẽ(t)) for the current speech sample being processed and the estimate of the raw speech sample (ŝ(t)) for the current speech sample being processed are stored. The processing then proceeds to step s35 where the system determines whether or not all the speech samples in the current frame have been processed. If they have not, then the processing proceeds to step s37 where the time variable t is decremented by one so that the previous sample in the current frame will be processed in the same way. Once all N samples in the current frame have been processed in this way and the corresponding process noise and raw speech samples have been stored, the second stage of the Simulation Smoother is complete and an estimate of s(n) will have been generated.

As shown in equations (4) and (8), the matrix S and the matrix Y require raw speech samples s(n–N–1) to s(n–N–k+1) and s(n–N–1) to s(n–N–r+1) respectively in addition to those in s(n). These additional raw speech samples can be obtained either from the processing of the previous frame of speech or if there are no previous frames, they can be set to zero. With these estimates of raw speech samples, the Gibbs sampler can be run to draw samples from the above described probability density functions.

Statistical Analysis Unit—Operation

A description has been given above of the theory underlying the statistical analysis unit 21. A description will now be given with reference to FIGS. 6 to 8 of the operation of the statistical analysis unit 21.

Figure 6:
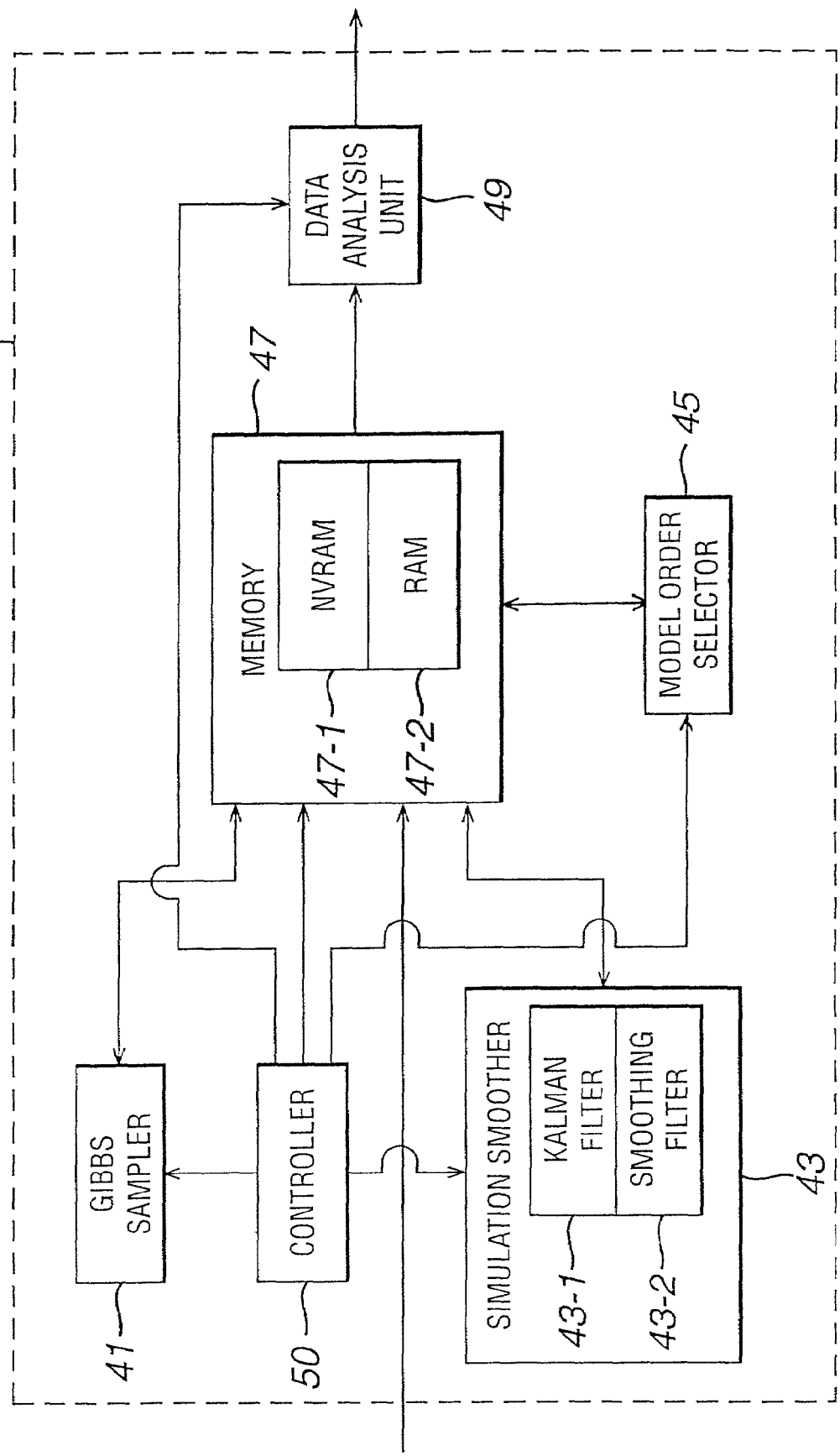
FIG. 6 is a block diagram illustrating the main processing components of the statistical analysis unit shown in FIG. 2.

FIG. 6 is a block diagram illustrating the principal components of the statistical analysis unit 21 of this embodiment. As shown, it comprises the above described Gibbs sampler 41, Simulation Smoother 43 (including the Kalman filter 43-1 and smoothing filter 43-2) and model order selector 45. It also comprises a memory 47 which receives the speech samples of the current frame to be processed, a data analysis unit 49 which processes the data generated by the Gibbs sampler 41 and the model order selector 45 and a controller 50 which controls the operation of the statistical analysis unit 21.

As shown in FIG. 6, the memory 47 includes a non volatile memory area 47-1 and a working memory area 47-2. The non volatile memory 47-1 is used to store the joint probability density function given in equation (19) above and the equations for the variances and mean values and the equations for the Inverse Gamma parameters given above in equations (22) to (24) and (27) to (30) for the above mentioned conditional probability density functions for use by the Gibbs sampler 41. The non volatile memory 47-1 also stores the Kalman filter equations given above in equation (33) and the smoothing filter equations given above in equation 34 for use by the Simulation Smoother 43.

Figure 7:
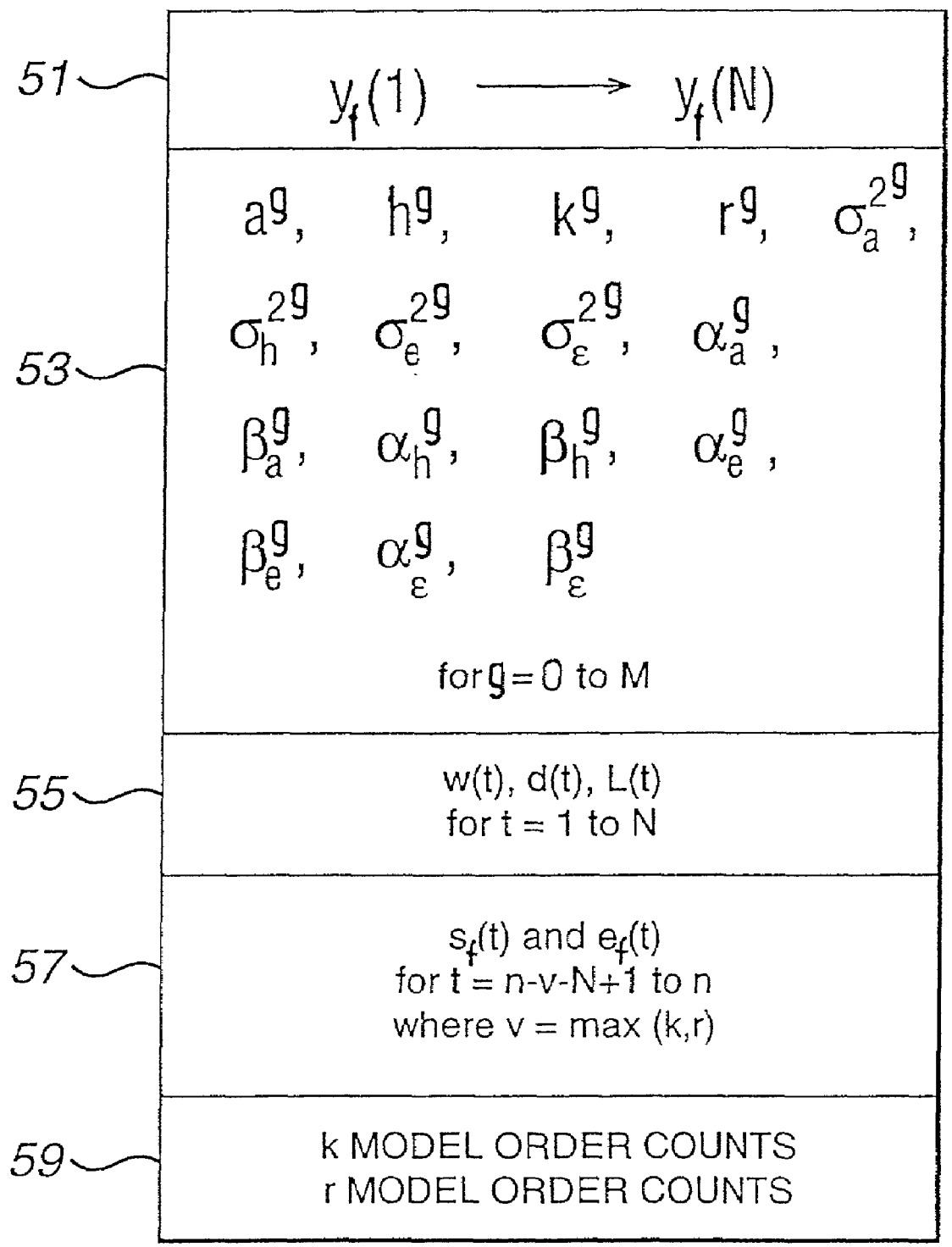
FIG. 7 is a memory map illustrating the data that is stored in a memory which forms part of the statistical analysis unit shown in FIG. 2.

FIG. 7 is a schematic diagram illustrating the parameter values that are stored in the working memory area (RAM) 47-2. As shown, the RAM includes a store 51 for storing the speech samples $y_f(1)$ to $y_f(N)$ output by the analogue to digital converter 17 for the current frame (f) being processed. As mentioned above, these speech samples are used in both the Gibbs sampler 41 and the Simulation Smoother 43. The RAM 47-2 also includes a store 53 for storing the initial estimates of the model parameters (g=0) and the M samples (g=1 to M) of each parameter drawn from the above described conditional probability density functions by the Gibbs sampler 41 for the current frame being processed. As mentioned above, in this embodiment, M is 100 since the Gibbs sampler 41 performs 150 iterations on each frame of input speech with the first fifty samples being discarded. The RAM 47-2 also includes a store 55 for storing W(t), d(t) and L(t) for t=1 to N which are calculated during the processing of the speech samples in the current frame of speech by the above described Kalman filter 43-1. The RAM 47-2 also includes a store 57 for storing the estimates of the raw speech samples ($\hat{s}_f(t)$) and the estimates of the process noise ($\tilde{e}_f(t)$) generated by the smoothing filter 43-2, as discussed above. The RAM 47-2 also includes a store 59 for storing the model order counts which are generated by the model order selector 45 when the model orders for the AR filter model and the channel model are updated.

FIG. 8 is a flow diagram illustrating the control program used by the controller 50, in this embodiment, to control the processing operations of the statistical analysis unit 21. As shown, in step s41, the controller 50 retrieves the next frame of speech samples to be processed from the buffer 19 and stores them in the memory store 51. The processing then proceeds to step s43 where initial estimates for the channel model, raw speech samples and the process noise and measurement noise statistics are set and stored in the store 53. These initial estimates are either set to be the values obtained during the processing of the previous frame of speech or, where there are no previous frames of speech, are set to their expected values (which may be zero). The processing then proceeds to step s45 where the Simulation Smoother 43 is activated so as to provide an estimate of the raw speech samples in the manner described above. The processing then proceeds to step s47 where one iteration of the Gibbs sampler 41 is run in order to update the channel model, speech model and the process and measurement noise statistics using the raw speech samples obtained in step s45. These updated parameter values are then stored in the memory store 53.

The processing then proceeds to step s49 where the controller 50 determines whether or not to update the model orders of the AR filter model and the channel model. As mentioned above, in this embodiment, these model orders are updated every third Gibbs iteration. If the model orders are to be updated, then the processing proceeds to step s51 where the model order selector 45 is used to update the model orders of the AR filter model and the channel model in the manner described above. If at step s49 the controller 50 determines that the model orders are not to be updated, then the processing skips step s51 and the processing proceeds to step s53. At step s53, the controller 50 determines whether or not to perform another Gibbs iteration. If another iteration is to be performed, then the processing proceeds to decision block s55 where the controller 50 decides whether or not to update the estimates of the raw speech samples (s(t)). If the raw speech samples are not to be updated, then the processing returns to step s47 where the next Gibbs iteration is run.

As mentioned above, in this embodiment, the Simulation Smoother 43 is run every fourth Gibbs iteration in order to update the raw speech samples. Therefore, if the controller 50 determines, in step s55 that there has been four Gibbs iterations since the last time the speech samples were updated, then the processing returns to step s45 where the Simulation Smoother is run again to provide new estimates of the raw speech samples (s(t)). Once the controller 50 has determined that the required 150 Gibbs iterations have been performed, the controller 50 causes the processing to proceed to step s57 where the data analysis unit 49 analyses the model order counts generated by the model order selector 45 to determine the model orders for the AR filter model and the channel model which best represents the current frame of speech being processed. The processing then proceeds to step s59 where the data analysis unit 49 analyses the samples drawn from the conditional densities by the Gibbs sampler 41 to determine the AR filter coefficients ($\underline{a}$), the channel model coefficients ($\underline{h}$), the variances of these coefficients and the process and measurement noise variances which best represent the current frame of speech being processed. The processing then proceeds to step s61 where the controller 50 determines whether or not there is any further speech to be processed. If there is more speech to be processed, then processing returns to step S41 and the above process is repeated for the next frame of speech. Once all the speech has been processed in this way, the processing ends.

Data Analysis Unit

Figure 9A:
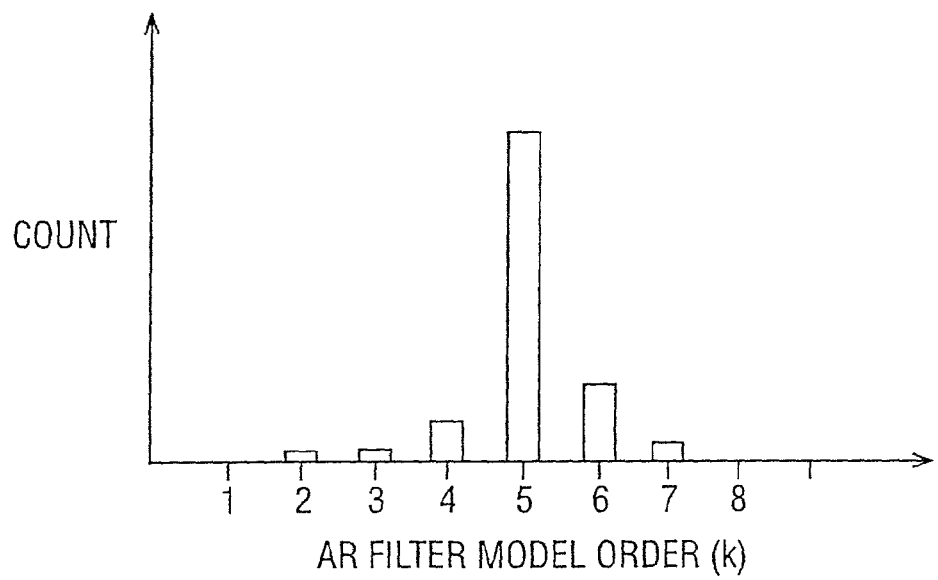
FIG. 9a is a histogram for a model order of an auto regressive filter model which forms part of the model shown in FIG. 3.

A more detailed description of the data analysis unit 49 will now be given with reference to FIG. 9. As mentioned above, the data analysis unit 49 initially determines, in step s57, the model orders for both the AR filter model and the channel model which best represents the current frame of speech being processed. It does this using the counts that have been generated by the model order selector 45 when it was run in step s51. These counts are stored in the store 59 of the RAM 47-2. In this embodiment, in determining the best model orders, the data analysis unit 49 identifies the model order having the highest count. FIG. 9a is an exemplary histogram which illustrates the distribution of counts that is generated for the model order (k) of the AR filter model. Therefore, in this example, the data analysis unit 49 would set the best model order of the AR filter model as five. The data analysis unit 49 performs a similar analysis of the counts generated for the model order (r) of the channel model to determine the best model order for the channel model.

Figure 9B:
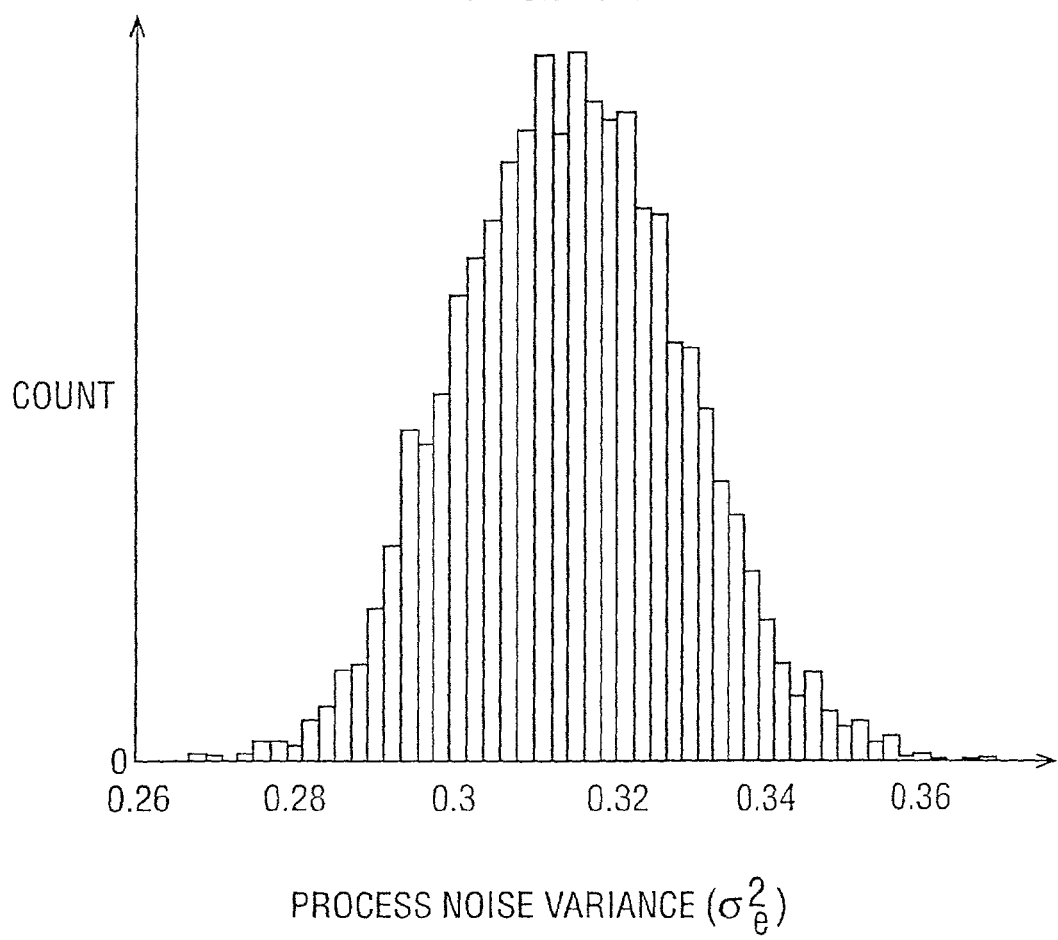
FIG. 9b is a histogram for the variance of process noise modelled by the model shown in FIG. 3.

Once the data analysis unit 49 has determined the best model orders (k and r), it then analyses the samples generated by the Gibbs sampler 41 which are stored in the store 53 of the RAM 47-2, in order to determine parameter values that are most representative of those samples. It does this by determining a histogram for each of the parameters from which it determines the most representative parameter value. To generate the histogram, the data analysis unit 49 determines the maximum and minimum sample value which was drawn by the Gibbs sampler and then divides the range of parameter values between this minimum and maximum value into a predetermined number of sub-ranges or bins. The data analysis unit 49 then assigns each of the sample values into the appropriate bins and counts how many samples are allocated to each bin. It then uses these counts to calculate a weighted average of the samples (with the weighting used for each sample depending on the count for the corresponding bin), to determine the most representative parameter value (known as the minimum mean square estimate (MMSE)). FIG. 9b illustrates an example histogram which is generated for the variance ($\sigma_e^2$) of the process noise, from which the data analysis unit 49 determines that the variance representative of the sample is 0.3149.

In determining the AR filter coefficients ($a_i$ for i=1 to k), the data analysis unit 49 determines and analyses a histogram of the samples for each coefficient independently. FIG. 9c shows an exemplary histogram obtained for the third AR filter coefficient ($a_3$), from which the data analysis unit 49 determines that the coefficient representative of the samples is −0.4977.

Figure 2:
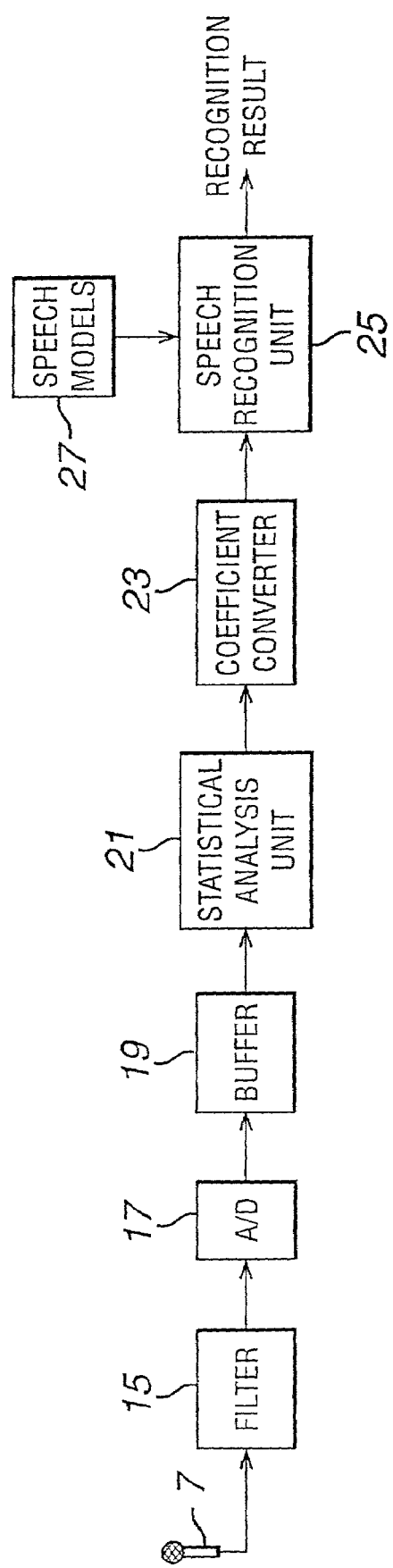
FIG. 2 is a block diagram illustrating the principal components of a speech recognition system.

In this embodiment, the data analysis unit 49 only outputs the AR filter coefficients which are passed to the coefficient convertor 23 shown in FIG. 2. The remaining parameter values determined by the data analysis unit 49 are stored in the RAM 47-2 for use during the processing of the next frame of speech. As mentioned above, the AR filter coefficients output by the statistical analysis unit 21 are input to the coefficient convertor 23 which converts these coefficients into cepstral coefficients which are then compared with stored speech models 27 by the speech recognition unit 25 in order to generate a recognition result.

As the skilled reader will appreciate, a speech processing technique has been described above which uses statistical analysis techniques to determine sets of AR filter coefficients representative of an input speech signal. The technique is more robust and accurate than prior art techniques which employ maximum likelihood estimators to determine the AR filter coefficients. This is because the statistical analysis of each frame uses knowledge obtained from the processing of the previous frame. In addition, with the analysis performed above, the model order for the AR filter model is not assumed to be constant and can vary from frame to frame. In this way, the optimum number of AR filter coefficients can be used to represent the speech within each frame. As a result, the AR filter coefficients output by the statistical analysis unit 21 will more accurately represent the corresponding input speech. Further still, since the underlying process model that is used separates the speech source from the channel, the AR filter coefficients that are determined will be more representative of the actual speech and will be less likely to include distortive effects of the channel. Further still, since variance information is available for each of the parameters, this provides an indication of the confidence of each of the parameter estimates. This is in contrast to maximum likelihood and least squares approaches, such as linear prediction analysis, where point estimates of the parameter values are determined.

Alternative Embodiments

In the above embodiment, the statistical analysis unit was used as a pre-processor for a speech recognition system in order to generate AR coefficients representative of the input speech. It also generated a number of other parameter values (such as the process noise variances and the channel model coefficients), but these were not output by the statistical analysis unit. As those skilled in the art will appreciate, the AR coefficients and some of the other parameters which are calculated by the statistical analysis unit can be used for other purposes. For example, FIG. 10 illustrates a speech recognition system which is similar to the speech recognition system shown in FIG. 2 except that there is no coefficient converter since the speech recognition unit 25 and speech models 27 are AR coefficient based. The speech recognition system shown in FIG. 10 also has an additional speech detection unit 61 which receives the AR filter coefficients (a) together with the AR filter model order (k) generated by the statistical analysis unit 21 and which is operable to determine from them when speech is present within the signal received from the microphone 7. It can do this, since the AR filter model order and the AR filter coefficient values will be larger during speech than when there is no speech present. Therefore, by comparing the AR filter model order (k) and/or the AR filter coefficient values with appropriate threshold values, the speech detection unit 61 can determine whether or not speech is present within the input signal. When the speech detection unit 61 detects the presence of speech, it outputs an appropriate control signal to the speech recognition unit 25 which causes it to start processing the AR coefficients it receives from the statistical analysis unit 21. Similarly, when the speech detection unit 61 detects the end of speech, it outputs an appropriate control signal to the speech recognition unit 25 which causes it to stop processing the AR coefficients it receives from the statistical analysis unit 21.

In the above embodiments, a speech recognition system was described having a particular speech pre-processing front end which performed a statistical analysis of the input speech. As the those skilled in the art will appreciate, this pre-processing can be used in speech processing systems other than speech recognition systems. For example, as shown in FIG. 11, the statistical analysis unit 21 may form a front end to a speaker verification system 65. In this embodiment, the speaker verification system 65 compares the sequences of AR filter coefficients output by the statistical analysis unit 21 with pre-stored speaker models 67 to determine whether or not the received speech corresponds to a known user.

Figure 12:
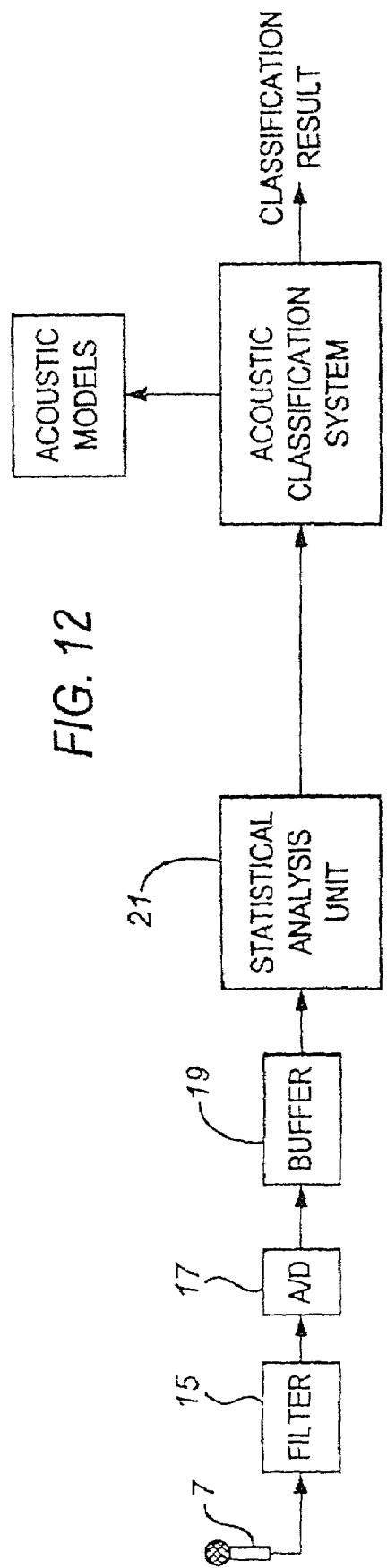
FIG. 12 is a schematic block diagram illustrating the principal components of an acoustic classification system.

FIG. 12 illustrates another application for the statistical analysis unit 21. In particular, FIG. 12 shows an acoustic classification system. The statistical analysis unit 21 is used to generate the AR filter coefficients for an input audio signal (which may or may not be speech) in the manner described above. These coefficients are then passed to an acoustic classification system 66 which compares the AR coefficients from the statistical analysis unit with pre-stored acoustic models 68 to generate the classification result. This classification system may be used, for example, to identify and categorise various input sounds, for example, percussion sounds, woodwind sounds, brass sounds as well as speech.

Figure 13:
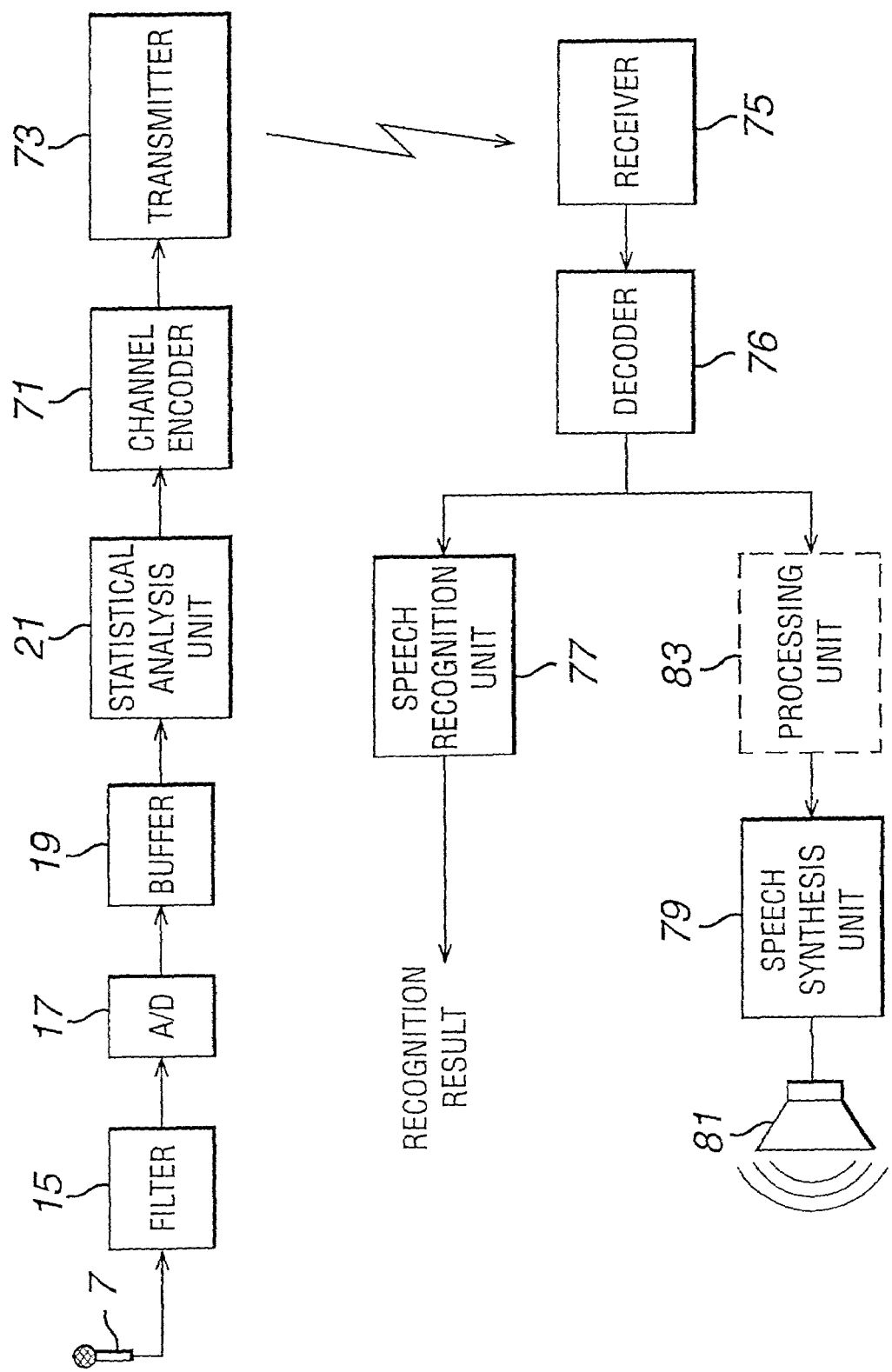
FIG. 13 is a schematic block diagram illustrating the principal components of a speech encoding and transmission.

FIG. 13 illustrates another application for the statistical analysis unit 21. In particular, FIG. 13 shows a speech encoding and transmission system. The statistical analysis unit 21 is used to generate the AR filter coefficients in the manner described above, which are then passed to a channel encoder which encodes the sequences of AR filter coefficients so that they are in a more suitable form for transmission through a communications channel. The encoded AR filter coefficients are then passed to a transmitter 73 where the encoded data is used to modulate a carrier signal which is then transmitted to a remote receiver 75. The receiver 75 demodulates the received signal to recover the encoded data which is then decoded by a decoder 76. The sequences of AR filter coefficients output by the decoder are then either passed to a speech recognition unit 77 which compares the sequences of AR filter coefficients with stored reference models (not shown) to generate a recognition result or to a speech synthesis unit 79 which re-generates the speech and outputs it via a loudspeaker 81. As shown, prior to application to the speech synthesis unit 79, the sequences of AR filter coefficients may also pass through an optional processing unit 83 (shown in phantom) which can be used to manipulate the characteristics of the speech that is synthesised. One of the significant advantages of using the statistical analysis unit described above is that the model order for the AR filter model is not assumed to be constant and will vary from frame to frame. In this way, the optimum number of AR filter coefficients will be used to represent the speech within each frame. In contrast, with linear prediction analysis, the number of AR filter coefficients is assumed to be constant and hence the prior art techniques tend to over parameterise the speech in order to ensure that information is not lost. As a result, with the statistical analysis described above, the amount of data which has to be transmitted from the transmitter to the receiver will be less than with the prior art systems which assume a fixed size of AR filter model.

Figure 14:
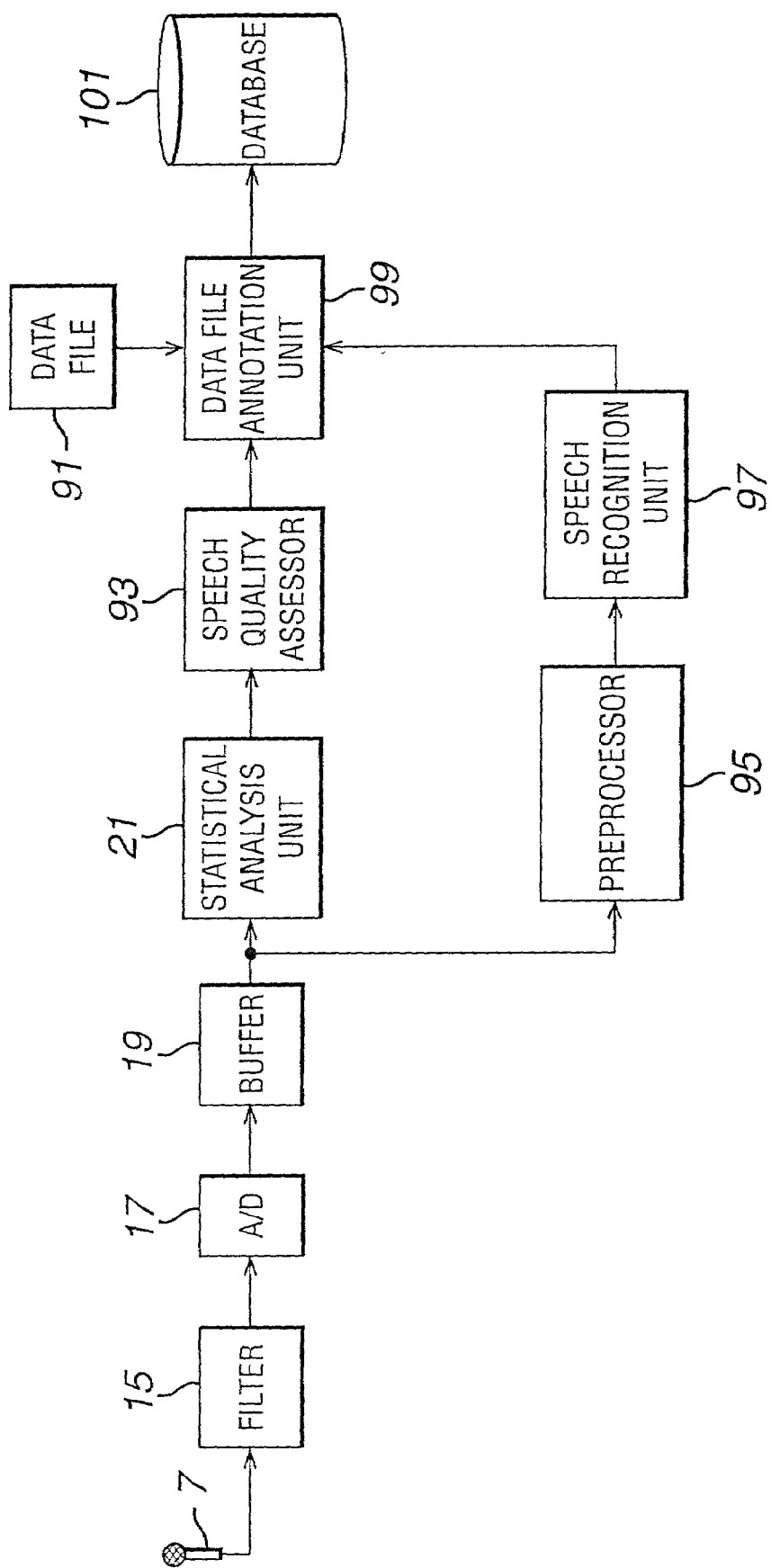
FIG. 14 is a block diagram illustrating the principal components of a data file annotation system which uses the statistical analysis unit shown in FIG. 6 to provide quality of speech data for an associated annotation.

FIG. 14 shows another system which uses the statistical analysis unit 21 described above. The system shown in FIG. 14 allows a user to add a voice annotation to a data file 91 for use in subsequent voice retrieval operations. In use, the user selects a data file to be annotated (which may be a photograph or the like). The user then speaks the voice annotation and the input speech received via the microphone 7 is processed by the statistical analysis unit 21 in the same way as described above, except the data analysis unit only outputs the variance ($\sigma_a^2$) of the AR filter coefficients for each frame of speech which is passed to a speech quality assessor 93. The speech quality assessor 93 uses this variance information as an indication of the quality of the input speech (although it will also depend on other factors). However, in general, when the input speech is of a high quality (i.e. not disturbed by high levels of background noise), the variance should be small and when there are high levels of noise, the variance should be large. The speech quality assessor 93 then outputs to a data file annotation unit 95 a signal identifying whether or not the input voice annotation is of a high quality. In this embodiment, the input speech is also passed through a traditional speech pre-processor 95 and then to a traditional speech recognition unit 97 which generates words and/or phonemes representative of the input speech which are then passed to the data file annotation unit 99. The data file annotation unit 99 then annotates the selected data file 91 with the data output by the speech recognition unit 97 and the data output by the speech quality assessor 93 and stores the annotated data file in a database 101.

As the those skilled in the art will appreciate, this speech quality indication which is stored with the data file is useful for subsequent retrieval operations. In particular, when the user wishes to retrieve a data file 91 from the database 101 (using a voice query), it is useful to know the quality of the speech that was used to annotate the data file and/or the quality of the voice retrieval query used to retrieve the data file, since this will affect the retrieval performance. In particular if the voice annotation is of a high quality and the user's retrieval query is also of a high quality, then a stringent search of the database 101 can be performed, in order to reduce the amount of false identifications. In contrast, if the original voice annotation is of a low quality or if the user's retrieval query is of a low quality, then a less stringent search of the database 101 can be performed to give a higher chance of retrieving the correct data file 91.

In addition to using the variance of the AR filter coefficients as an indication of the speech quality, the variance ($\sigma_e^2$) of the process noise is also a good measure of the quality of the input speech, since this variance is also measure of the energy in the process noise. Therefore, the variance of the process noise can be used in addition to or instead of the variance of the AR filter coefficients to provide the measure of quality of the input speech.

In the above embodiment, a separate preprocessor 95 was provided as the front end to the speech recognition unit 97. As those skilled in the art will appreciate, the statistical analysis unit 21 may act as the preprocessor for the speech recognition unit 97. Likewise, in the speech recognition system described above with reference to FIG. 10, the statistical analysis unit 21 may be used solely for providing information to the speech detection unit 61 and a separate speech preprocessor may be used to parameterise the input speech for use by the speech recognition unit 25. However, such separate parameterisation of the input speech is not preferred because of the additional processing overhead involved.

In the first embodiment described above, the AR filter coefficients output by the statistical analysis unit 21 were converted into cepstral coefficients since the speech recognition unit used in the first embodiment was a cepstral based system. As those skilled in the art will appreciate, if the speech recognition system is designed to work with other spectral coefficients, then the coefficient converter 23 may be arranged to convert the AR filter coefficients into the appropriate spectral parameters. Alternatively still, if the speech recognition system is designed to operate with AR coefficients, then the coefficient converter 23 is unnecessary.

In the above embodiments, Gaussian and Inverse Gamma distributions were used to model the various prior probability density functions of equation (19). As those skilled in the art of statistical analysis will appreciate, the reason these distributions were chosen is that they are conjugate to one another. This means that each of the conditional probability density functions which are used in the Gibbs sampler will also either be Gaussian or Inverse Gamma. This therefore simplifies the task of drawing samples from the conditional probability densities. However, this is not essential. The noise probability density functions could be modelled by Laplacian or student-t distributions rather than Gaussian distributions. Similarly, the probability density functions for the variances may be modelled by a distribution other than the Inverse Gamma distribution. For example, they can be modelled by a Rayleigh distribution or some other distribution which is always positive. However, the use of probability density functions that are not conjugate will result in increased complexity in drawing samples from the conditional densities by the Gibbs sampler.

Additionally, whilst the Gibbs sampler was used to draw samples from the probability density function given in equation (19), other sampling algorithms could be used.

For example the Metropolis-Hastings algorithm (which is reviewed together with other techniques in a paper entitled "Probabilistic inference using Markov chain Monte Carlo methods" by R. Neal, Technical Report CRG-TR-93-1, Department of Computer Science, University of Toronto, 1993) may be used to sample this probability density.

In the above embodiment, a Simulation Smoother was used to generate estimates for the raw speech samples. This Simulation Smoother included a Kalman filter stage and a smoothing filter stage in order to generate the estimates of the raw speech samples. In an alternative embodiment, the smoothing filter stage may be omitted, since the Kalman filter stage generates estimates of the raw speech (see equation (33)). However, these raw speech samples were ignored, since the speech samples generated by the smoothing filter are considered to be more accurate and robust. This is because the Kalman filter essentially generates a point estimate of the speech samples from the joint probability density function $p(\underline{s}(n)|\underline{a},k,\sigma_e^2)$, whereas the Simulation Smoother draws a sample from this probability density function.

In the above embodiment, a Simulation Smoother was used in order to generate estimates of the raw speech samples. It is possible to avoid having to estimate the raw speech samples by treating them as "nuisance parameters" and integrating them out of equation (19). However, this is not preferred, since the resulting integral will have a much more complex form than the Gaussian and Inverse Gamma mixture defined in equation (19). This in turn will result in more complex conditional probabilities corresponding to equations (20) to (30). In a similar way, the other nuisance parameters (such as the coefficient variances or any of the Inverse Gamma, alpha and beta parameters) may be integrated out as well. However, again this is not preferred, since it increases the complexity of the density function to be sampled using the Gibbs sampler. The technique of integrating out nuisance parameters is well known in the field of statistical analysis and will not be described further here.

In the above embodiment, the data analysis unit analysed the samples drawn by the Gibbs sampler by determining a histogram for each of the model parameters and then determining the value of the model parameter using a weighted average of the samples drawn by the Gibbs sampler with the weighting being dependent upon the number of samples in the corresponding bin. In an alterative embodiment, the value of the model parameter may be determined from the histogram as being the value of the model parameter having the highest count. Alternatively, a predetermined curve (such as a bell curve) could be fitted to the histogram in order to identify the maximum which best fits the histogram.

In the above embodiment, the statistical analysis unit modelled the underlying speech production process with a separate speech source model (AR filter) and a channel model. Whilst this is the preferred model structure, the underlying speech production process may be modelled without the channel model. In this case, there is no need to estimate the values of the raw speech samples using a Kalman filter or the like, although this can still be done. However, such a model of the underlying speech production process is not preferred, since the speech model will inevitably represent aspects of the channel as well as the speech. Further, although the statistical analysis unit described above ran a model order selection routine in order to allow the model orders of the AR filter model and the channel model to vary, this is not essential. In particular, the model order of the AR filter model and the channel model may be fixed in advance, although this is not preferred since it will inevitably introduce errors into the representation.

In the above embodiments, the speech that was processed was received from a user via a microphone. As those skilled in the art will appreciate, the speech may be received from a telephone line or may have been stored on a recording medium. In this case, the channel model will compensate for this so that the AR filter coefficients representative of the actual speech that has been spoken should not be significantly affected.

In the above embodiments, the speech generation process was modelled as an auto-regressive (AR process and the channel was modelled as a moving average (MA) process. As those skilled in the art will appreciate, other signal models may be used. However, these models are preferred because it has been found that they suitably represent the speech source and the channel they are intended to model.

In the above embodiments, during the running of the model order selection routine, a new model order was proposed by drawing a random variable from a predetermined Laplacian distribution function. As those skilled in the art will appreciate, other techniques may be used. For example the new model order may be proposed in a deterministic way (ie under predetermined rules), provided that the model order space is sufficiently sampled.

The invention claimed is:

1. A speech processing apparatus comprising:
    means for receiving a set of speech signal values representative of a speech signal generated by a speech source as distorted by a transmission channel between the speech source and the receiving means;
    a memory for storing data defining a predetermined function derived from a predetermined signal model which includes a first part having first parameters which models said source and a second part having second parameters which models said channel, said function being in terms of said first and second parameters and in terms of a set of speech signal values and generating, for a given set of received signal values, a probability density function which defines, for a given set of first and second parameters, the probability that the predetermined signal model has those parameter values, given that the signal is assumed to have generated the received set of signal values;
    means for applying said set of received signal values to said stored function; and
    means for processing said function with those values applied to obtain values of said first parameters that are representative of said speech generated by said speech source before it was distorted by said transmission channel.

2. An apparatus according to claim 1, wherein said processing means comprises means for drawing samples from said probability density function and means for determining said values of said first parameters that are representative of the speech from the drawn samples.

3. An apparatus according to claim 2, further comprising means for evaluating said probability density function for the set of received signal values using one or more of said drawn samples or parameter values for different numbers of parameter values, to determine respective probabilities that the predetermined signal model has those parameter values and wherein said processing means is operable to process at least some of said drawn samples of parameter values and said evaluated probabilities to determine said values of said first parameters that are representative of the speech generated by said source before it was distorted by said transmission channel.

4. An apparatus according to claim 2, wherein said processing means is operable to determine a histogram of said drawn samples and wherein said values of said first parameters are determined from said histogram.

5. An apparatus according to claim 4, wherein said processing means is operable to determine said values of said first parameters using a weighted sum of said drawn samples, and wherein the weighting is determined from said histogram.

6. An apparatus according to claim 2, wherein said sampling means is operable to draw samples iteratively from said probability density function.

7. An apparatus according to claim 2, wherein said sampling means is operable to draw samples of both said first and second parameters.

8. An apparatus according to claim 2, wherein said sampling means comprises a Gibbs sampler.

9. An apparatus according to claim 2, wherein said processing means comprises means for analysing at least some of said drawn samples of parameter values to determine a measure of the variance of said samples and the apparatus further comprises means for outputting a signal indicative of the quality of the received set of signal values in dependence upon said determined variance measure.

10. An apparatus according to claim 9, wherein said probability density function is in terms of said variance measure and wherein said analysing means is operable to draw samples of said variance measure from said probability density function.

11. An apparatus according to claim 1, wherein said function is in terms of a set of raw speech signal values representative of speech generated by said source before being distorted by said transmission channel, wherein the apparatus further comprises second processing means for processing the received set of signal values with initial estimates of said first and second parameters, to generate an estimate of the raw speech signal values corresponding to the received set of signal values and wherein said applying means is operable to apply said estimated set of raw speech signal values to said function in addition to said set of received signal values.

12. An apparatus according to claim 11, wherein said second processing means comprises a simulation smoother.

13. An apparatus according to claim 11, wherein said second processing means comprises a Kalman filter.

14. An apparatus according to claim 1, wherein said receiving means is operable to receive a sequence of sets of signal values representative of a speech signal generated by a speech source as distorted by said transmission channel and wherein said processing means is operable to obtain values of said first parameters for the speech within each set of signal values in said sequence.

15. An apparatus according to claim 14, wherein said processing means is operable to use the values of said first parameters obtained during the processing of a preceding set of signal values as initial estimates for the values of said first parameters for a current set of signal values being processed.

16. An apparatus according to claim 14, wherein said sets of signal values in said sequence are non-overlapping.

17. An apparatus according to claim 14, wherein said processing means comprises means for varying the number of parameter values used to represent the speech signal within each set of signal values.

18. An apparatus according to claim 1, wherein said first part is an auto-regressive model and said first parameters comprise auto-regressive model coefficients.

19. An apparatus according to claim 1, wherein said second part is a moving average model and said second parameters comprise moving average model coefficients.

20. An apparatus according to claim 1, further comprising means for comparing said determined parameter values with pre-stored parameter values to generate a comparison result.

21. An apparatus according to claim 1, further comprising recognition means for comparing said determined parameter values with pre-stored reference models to generate a recognition result.

22. An apparatus according to claim 1, further comprising speaker verification means for comparing said determined parameter values with pre-stored speaker models to generate a verification result.

23. A speech processing method comprising the steps of:
receiving a set of speech signal values representative of a speech signal generated by a speech source as modified by a transmission channel between the speech source and a receiver;
storing data defining a predetermined function derived from a predetermined signal model which includes a first part having first parameters which models said source and a second part having second parameters which models said channel, said function being in terms of said first and second parameters and generating, for a given set of signal values, a probability density function which defines, for a given set of first parameters and second parameters, the probability that the predetermined signal model has those parameter values, given that the signal model is assumed to have generated the received set of signal values;
applying said set of received speech signal values to said function;
processing said function with those values applied to derive samples of at least said first parameters from said probability density function; and
analysing at least some of said derived samples to determine values of said first parameters that are representative of said speech signal generated by said source before it was modified by said transmission channel.

24. A method according to claim 23, wherein said processing step comprises the steps of drawing samples from said probability density function and determining said values of said first parameters that are representative of the speech from the drawn samples.

25. A method according to claim 24, further comprising the step of evaluating said probability density function for the set of received signal values using one or more of said drawn samples of parameter values for different numbers of parameter values, to determine respective probabilities that the predetermined signal model has those parameter values and wherein said processing step processes at least some of said drawn samples of parameter values and said evaluated probabilities to determine said values of said first parameters that are representative of the speech generated by said source before it was distorted by said transmission channel.

26. A method according to claim 24, wherein said processing step determines a histogram of said drawn samples and wherein said values of said first parameters are determined from said histogram.

27. A method according to claim 26, wherein said processing step determines said values of said first parameters using a weighted sum of said drawn samples, and wherein the weighting is determined from said histogram.

28. A method according to claim 24, wherein said sampling step draws samples iteratively from said probability density function.

29. A method according to claim 24, wherein said sampling step draws samples of both said first and second parameters.

30. A method according to claim 24, wherein said sampling step uses a Gibbs sampling technique.

31. A method according to claim 24, wherein said processing step comprises the step of analysing at least some of said drawn samples of parameter values to determine a measure of the variance of said samples and wherein the method further comprises the step of outputting a signal indicative of the quality of the received set of signal values in dependence upon said determined variance measure.

32. A method according to claim 31, wherein said probability density function is in terms of said variance measure and wherein said analysing step draws samples of said variance measure from said probability density function.

33. A method according to claim 23, wherein said function is in terms of a set of raw speech signal values representative of speech generated by said source before being distorted by said transmission channel, wherein the method further comprises a second processing step of processing the received set of signal values with initial estimates of said first and second parameters, to generate an estimate of the raw speech signal values corresponding to the received set of signal values and wherein said applying step applies said estimated set of raw speech signal values to said function in addition to said set of received signal values.

34. A method according to claim 33, wherein said second processing step uses a simulation smoother.

35. A method according to claim 23, wherein said second processing step uses a Kalman filter.

36. A method according to claim 23, wherein said receiving step receives a sequence of sets of signal values representative of a speech signal generated by a speech source as distorted by said transmission channel and wherein said processing step obtains values of said first parameters for the speech within each set of signal values in said sequence.

37. A method according to claim 36, wherein said processing step uses the values of said first parameters obtained during the processing of a preceding set of signal values as initial estimates for the values of said first parameters for a current set of signal values being processed.

38. A method according to claim 36, wherein said sets of signal values in said sequence are non-overlapping.

39. A method according to claim 36, wherein said processing step comprises the step of varying the number of parameter values used to represent the speech signal within each set of signal values.

40. A method according to claim 23, wherein said first part is an auto aggressive model and said first parameters comprise auto aggressive model coefficients.

41. A method according to claim 23, wherein said second part is a moving average model and said second parameters comprise moving average model coefficients.

42. A method according to claim 23, further comprising the step of comparing said determined parameter values with pre-stored parameter values to generate a comparison result.

43. A method according to claim 23, further comprising the step of comparing said determined parameter values with pre-stored reference models to generate a recognition result.

44. A method according to claim 23, further comprising speaker verification means for comparing said determined parameter values with pre-stored speaker models to generate a verification result.

45. A speech processing apparatus comprising:
means for receiving a set of signal values representative of a speech signal generated by a speech source as modified by a transmission channel between the speech source and the receiving means;
a memory for storing data defining a predetermined function derived from a predetermined signal model which includes a first part having first parameters which models said source and a second part having second parameters which models said channel, said function being in terms of said first and second parameters and generating, for a given set of signal values, a probability density function which defines, for a given set of first parameters and second parameters, the probability that the predetermined signal model has those parameter values, given that the signal model is assumed to have generated the received set of signal values;

means for applying said set of received signal values to said function;

means for processing said function with those values applied to derive samples of at least said first parameters from said probability density function; and means for analysing at least some of said derived samples to determine values of said first parameters that are representative of said speech signal generated by said source before it was modified by said transmission channel.

46. A speech processing apparatus comprising:

means for receiving a set of signal values representative of a speech signal generated by a speech source as distorted by a transmission channel between the speech source and the receiving means;

a memory for storing data defining a predetermined function derived from a predetermined signal model which includes a first part having first parameters which models said source and a second part having second parameters which models said channel, said function being in terms of said first and second parameters and being in terms of a set of raw speech signal values representative of speech generated by said source before being distorted by said transmission channel, said function generating, for a given set of signal values, a probability density function which defines, for a given set of first parameters, second parameters and raw speech signal values, the probability that the predetermined signal model has those parameter values and generates said raw speech signal values, given that the signal mode is assumed to have generated the received set of signal values;

means for processing said received set of signal values with initial estimates of said first and second parameters, to generate an estimate of the raw speech signal values corresponding to the received set of signal values;

means for applying said set of received signal values and the estimated set of raw speech signal values to said function; and means for processing said function with those values applied to obtain values of said first parameters that are representative of said speech signal generated by said speech source before it was distorted by said transmission channel.

47. A speech processing apparatus comprising:

means for receiving a set of signal values representative of a speech signal generated by a speech source as modified by a transmission channel between the signal source and the receiving means;

a memory for storing data defining a predetermined function derived from a predetermined signal model which includes a first part having first parameters which models said source and a second part having second parameters which models said channel, said function being in terms of said first and second parameters and being in terms of a set of raw speech signal values representative of a speech signal generated by said source before being modified by said transmission channel, said function generating, for a given set of signal values, a probability density function which defines, for a given set of first parameters, second parameters and raw speech signal values, the probability that the predetermined signal model has those parameter values and generates said raw speech signal values, given that the signal model is assumed to have generated the received set of signal values;

means for processing said received set of signal values with initial estimates of said first and second parameters, to generate an estimate of said set of raw speech signal values corresponding to the received set of signal values;

means for applying said set of received signal values and the estimated set of raw speech signal values to said function;

means for processing said function with those values applied to derive samples of at least said first parameters from said probability density function; and means for analysing at least some of said derived samples to determine values of said first parameters that are representative of said speech signal generated by said speech source before it was modified by said transmission channel.

48. An apparatus for determining sets of parameter values representative of an input speech signal, the apparatus comprising:

means for receiving a plurality of speech signal values representative of a speech signal generated by a speech source as distorted by a transmission channel between the speech source and the receiving means;

means for dividing the plurality of speech signal values into a succession of groups of speech signal values; and means for processing the speech signal values in each group to determine a set of parameter values representative of the speech signal values in the group;

wherein said processing means comprises:

a memory for storing data defining a predetermined function which gives, for a set of speech signal values of a group, a probability density for parameters of a predetermined signal model including a first part having first parameters which models said source and a second part having second parameters which models said channel, with the predetermined signal model assumed to have generated the speech signal values in the group, the probability density defining, for a given set of parameter values, the probability that the predetermined signal model has those parameter values, given that the model is assumed to have generated the speech signal values in the group;

means for applying the set of speech signal values of a current group to said stored function to give the probability density for said model parameters for the current group;

means for processing said function to derive samples of parameter values from said probability density for the current group;

means for evaluating said probability density for the current group using one or more of said derived samples of parameter values for different numbers of parameter values to determine respective probabilities that the predetermined signal model has those parameter values; and means for processing at least some of said derived samples of parameter values and said evaluated probabilities to determine model parameters that are representative of the set of signal values in the current group.

49. An audio comparison apparatus comprising:
a memory for storing a predetermined function which gives, for a given set of audio signal values, a probability density for parameters of a predetermined audio model including a first part having first parameters which models an audio source and a second part having second parameters which models a transmission channel, with the predetermined audio model assumed to have generated the set of audio signal values, the probability density defining, for a given set of model parameter values, the probability that the predetermined audio model has those parameter values, given that the model is assumed to have generated the set of audio signal values;
means for receiving a set of audio signal values representative of an audio signal generated by the audio source as distorted by the transmission channel between the audio source and the receiving means;
means for applying the set of received audio signal values to said stored function to give the probability density for said model parameters for the set of received audio signal values;
means for processing said function, with said set of received audio signal values applied, to derive samples of parameter values from said probability density;
means for analysing at least some of said derived samples of parameter values to determine parameter values that are representative of the set of received audio signal values; and
means for comparing said determined parameter values with pre-stored parameter values to generate a comparison result.

50. A speech recognition system comprising an audio comparison apparatus according to claim 49.

51. A speaker verification system comprising an audio comparison apparatus according to claim 49.

52. An acoustic classification system comprising an audio comparison apparatus according to claim 49.

53. A speech processing apparatus comprising:
a receiver operable to receive a set of speech signal values representative of a speech signal generated by a speech source as distorted by a transmission channel between the speech source and the receiver;
a memory operable to store data defining a predetermined function derived from a predetermined signal model which includes a first part having first parameters which models said source and a second part having second parameters which models said channel and said function being in terms of said first and second parameters and in terms of a set of speech signal values and generating, for a given set of received signal values, a probability density function which defines, for a given set of first and second parameters, the probability that the predetermined signal model has those parameter values, given that the signal mode is assumed to have generated the received set of signal values;
an applicator operable to apply said set of received signal values to said stored function; and
a processor operable to process said function with those values applied to obtain values of said first parameters that are representative of said speech generated by said speech source before it was distorted by said transmission channel.

54. An apparatus according to claim 53, wherein said processor comprises a sampler operable to draw samples from said probability density function and a determiner operable to determine said values of said first parameters that are representative of the speech from the drawn samples.

55. An apparatus according to claim 54, further comprising an evaluator operable to evaluate said probability density function for the set of received signal values using one or more of said drawn samples or parameter values for different numbers of parameter values, to determine respective probabilities that the predetermined signal model has those parameter values and wherein said processor is operable to process at least some of said drawn samples of parameter values and said evaluated probabilities to determine said values of said first parameters that are representative of the speech generated by said source before it was distorted by said transmission channel.

56. An apparatus according to claim 54, wherein said processor is operable to determine a histogram of said drawn samples and wherein said values of said first parameters are determined from said histogram.

57. An apparatus according to claim 54, wherein said processor comprises an analyser operable to analyse at least some of said drawn samples of parameter values to determine a measure of the variance of said samples and wherein the apparatus further comprises an outputter operable to output a signal indicative of the quality of the received set of signal values in dependence upon said determined variance measure.

58. An apparatus according to claim 54, wherein said second part is a moving average model and said second parameters comprise moving average model coefficients.

59. An apparatus according to claim 53, wherein said function is in terms of a set of raw speech signal values representative of speech generated by said source before being distorted by said transmission channel, wherein the apparatus further comprises a second processor operable to process the received set of signal values with initial estimates of said first and second parameters, to generate an estimate of the raw speech signal values corresponding to the received set of signal values and wherein said applicator is operable to apply said estimated set of raw speech signal values to said function in addition to said set of received signal values.

60. An apparatus according to claim 53, wherein said receiver is operable to receive a sequence of sets of signal values representative of a speech signal generated by a speech source as distorted by said transmission channel and wherein said processor is operable to obtain values of said first parameters for the speech within each set of signal values in said sequence.

61. An apparatus according to claim 60, wherein said processor is operable to use the values of said first parameters obtained during the processing of a preceding set of signal values as initial estimates for the values of said first parameters for a current set of signal values being processed.

62. An apparatus according to claim 60, wherein said processor is operable to vary the number of parameter values used to represent the speech signal within each set of signal values.

63. An apparatus according to claim 53, wherein said first part is an auto-regressive model and said first parameters comprise auto-regressive model coefficients.

64. An apparatus according to claim 53, further comprising a comparator operable to compare said determined parameter values with pre-stored parameter values to generate a comparison result.

65. An apparatus according to claim 53, further comprising a recognition processor operable to compare said determined parameter values with pre-stored reference models to generate a recognition result.

66. An apparatus according to claim 53, further comprising a speaker verification processor operable to compare said determined parameter values with pre-stored speaker models to generate a verification result.

67. A computer readable medium storing computer implementable instructions for causing a programmable computer device to carry out a speech processing method, the instructions comprising instructions for:

receiving a set of signal values representative of a speech signal generated by a speech source as modified by a transmission channel between the speech source and a receiver;

storing data defining a predetermined function derived from a predetermined signal model which includes a first part having first parameters which models said source and a second part having second parameters which models said channel, said function being in terms of said first and second parameters and generating, for a given set of signal values, a probability density function which defines, for a given set of first parameters and second parameters, the probability that the predetermined signal model has those parameter values, given that the signal model is assumed to have generated the received set of signal values;

applying said set of received signal values to said function;

processing said function with those values applied to derive samples of at least said first parameters from said probability density function; and analysing at least some of said derived samples to determine values of said first parameters that are representative of said speech signal generated by said source before it was modified by said transmission channel.

68. A speech processing apparatus comprising:

a receiver operable to receive a set of signal values representative of a speech signal generated by a speech source as modified by a transmission channel between the speech source and the receiver;

a memory operable to store data defining a predetermined function derived from a predetermined signal model which includes a first part having first parameters which models said source and a second part having second parameters which models said channel, said function being in terms of said first and second parameters and generating, for a given set of signal values, a probability density function which defines, for a given set of first parameters and second parameters, the probability that the predetermined signal model has those parameter values, given that the signal model is assumed to have generated the received set of signal values;

an applicator operable to apply said set of received signal values to said function;

a processor operable to process said function with those values applied to derive samples of at least said first parameters from said probability density function; and an analyser operable to analyse at least some of said derived samples to determine values of said first parameters that are representative of said speech signal generated by said source before it was modified by said transmission channel.

69. A speech processing apparatus comprising:

a receiver operable to receive a set of signal values representative of a speech signal generated by a speech source as distorted by a transmission channel between the speech source and the receiver;

a memory operable to store data defining a predetermined function derived from a predetermined signal model which includes a first part having first parameters which models said source and a second part having second parameters which models said channel, said function being in terms of said first and second parameters and being in terms of a set of raw speech signal values representative of speech generated by said source before being distorted by said transmission channel, said function generating, for a given set of signal values, a probability density function which defines, for a given set of first parameters, second parameters and raw speech signal values, the probability that the predetermined signal model has those parameter values and generates said raw speech signal values, given that the signal model is assumed to have generated the received set of signal values;

a first processor operable to process said received set of signal values with initial estimates of said first and second parameters, to generate an estimate of the raw speech signal values corresponding to the received set of signal values;

an applicator operable to apply said set of received signal values and the estimated set of raw speech signal values to said function; and a second processor operable to process said function with those values applied to obtain values of said first parameters that are representative of said speech signal generated by said speech source before it was distorted by said transmission channel.

70. A speech processing apparatus comprising:

a receiver operable to receive a set of signal values representative of a speech signal generated by a speech source as modified by a transmission channel between the signal source and the receiver;

a memory operable to store data defining a predetermined function derived from a predetermined signal model which includes a first part having first parameters which models said source and a second part having second parameters which models said channel, said function being in terms of said first and second parameters and being in terms of a set of raw speech signal values representative of a speech signal generated by said source before being modified by said transmission channel, said function generating, for a given set of signal values, a probability density function which defines, for a given set of first parameters, second parameters and raw speech signal values, the probability that the predetermined signal model has those parameter values and generates said raw speech signal values, given that the signal model is assumed to have generated the received set of signal values;

a processor operable to process said received set of signal values with initial estimates of said first and second parameters, to generate an estimate of said set of raw speech signal values corresponding to the received set of signal values;

an applicator operable to apply said set of received signal values and the estimated set of raw speech signal values to said function;

a processor operable to process said function with those values applied to derive samples of at least said first parameters from said probability density function; and an analyser operable to analyse at least some of said derived samples to determine values of said first parameters that are representative of said speech signal generated by said speech source before it was modified by said transmission channel.

71. An apparatus for determining sets of parameter values representative of an input speech signal, the apparatus comprising:

a receiver operable to receive a plurality of speech signal values representative of speech signal generated by a speech source as distorted by a transmission channel between the speech source and the receiver;

a divider operable to divide the plurality of speech signal values into a succession of groups of speech signal values; and a processor operable to process the speech signal values in each group to determine a set of parameter values representative of the speech signal values in the group; wherein said processor comprises:

a memory operable to store data defining a predetermined function which gives, for a set of speech signal values of a group, a probability density for parameters of a predetermined signal model including a first part having first parameters which models said source and a second part having second parameters which models said channel, with the predetermined signal model assumed to have generated the speech signal values in the group, the probability density defining, for a given set of parameter values, the probability that the predetermined signal model has those parameter values, given that the model is assumed to have generated the speech signal values in the group;

an applicator operable to apply the set of speech signal values of a current group to said stored function to give the probability density for said model parameters for the current group;

a first sub-processor operable to process said function to derive samples of parameter values from said probability density for the current group;

an evaluator operable to evaluate said probability density for the current group using one or more of said derived samples of parameter values for different numbers of parameter values to determine respective probabilities that the predetermined signal model has those parameter values; and a second sub-processor operable to process at least some of said derived samples of parameter values and said evaluated probabilities to determine model parameters that are representative of the set of signal values in the current group.

72. An audio comparison apparatus comprising:

a memory operable to store a predetermined function which gives, for a given set of audio signal values, a probability density for parameters of a predetermined audio model including a first part having first parameters which models an audio source and a second part having second parameters which models a transmission channel, with the predetermined audio model assumed to have generated the set of audio signal values, the probability density defining, for a given set of model parameter values, the probability that the predetermined audio model has those parameter values, given that the model is assumed to have generated the set of audio signal values;

a receiver operable to receive a set of audio signal values representative of an audio signal generated by the audio source as distorted by the transmission channel between the audio source and the receiver;

an applicator operable to apply the set of received audio signal values to said stored function to give the probability density for said model parameters for the set of received audio signal values;

a processor operable to process said function, with said set of received audio signal values applied, to derive samples of parameter values from said probability density;

an analyser operable to analyse at least some of said derived samples of parameter values to determine parameter values that are representative of the set of received audio signal values; and a comparator operable to compare said determined parameter values with pre-stored parameter values to generate a comparison result.

* * * * *

UNITED STATES PATENT AND TRADEMARK OFFICE
CERTIFICATE OF CORRECTION

PATENT NO.       : 7,035,790 B2
APPLICATION NO.  : 09/866596
DATED            : April 25, 2006
INVENTOR(S)      : Jebu Jacob Rajan It is certified that error appears in the above-identified patent and that said Letters Patent is hereby corrected as shown below:

ON TITLE PAGE AT ITEM (56) FOREIGN PATENT DOCUMENTS

"JP   2001/044926   2/2001" should read --JP   2001-044926   2/2001--.

ON TITLE PAGE AT ITEM (56) OTHER PUBLICATIONS

Page 1, "Numerical Recipes in C by W. Press, et al., Chapter 7, Cambridge University Press (1992)." should be deleted.

Page 2, (first occurrence) delete:

""Reversible jump Markov chain Monte Carlo Computation and Bayesian model determination" by Peter Green, Biometrika, vol. 82, pp. 711-732 (1995).
"The Simulation Smoother For Time Series Models", Biometrika, vol. 82, 2, pp. 339-350 (1995).
"Probabilistic inference using Markov chain Monte Carlo methods" by R. Neal. Technical Report CRG-TR-93-1, Department of Computer Science, University of Toronto (1993).
"Fundamentals of Speech Recognition," Rabiner, et al., Prentice Hall, Englewood Cliffs, New Jersey, pp. 115 and 116, 1993.
"Bayesian Separation and Recovery of Convolutively Mixed Autoregssive Sources", Godsill, et al., ICASSP, Mar. 1999.
"Statistical Properties of STFT Ratios for Two Channel Systems and Application to Blind Source Separation", Balan, et al., IEEE Proc.-Vis. Image Signal Process., vol. 44, No. 4, Aug. 1997, pp. 429-434.
Bayesian Approach to Parameter Estimation and Interpolation of Time-Varying Autoregressive Interpolation of Time-Varying Autoregressive Processes Using the Gibbs Sampler, Rajan, et al., TEE Proc.-Vis. Image Signal Process., vol. 44, No. 4, Aug. 1997, pp. 249-256.
"An Introduction to the Kalman Filter", Welch, et al., Dept. of Computer Science, University of North Carolina at Chapel Hill, NC, Sep. 1997.";

After "Bayesian Separation and Recovery ..." (second occurrence): "Autoregssive" should read -- Autoregressive--;

After "Rajan, et al.,": "Bayesian" should read --"Bayesian--; and "Sampler," should read --Sampler","--.

UNITED STATES PATENT AND TRADEMARK OFFICE
CERTIFICATE OF CORRECTION

PATENT NO. : 7,035,790 B2
APPLICATION NO. : 09/866596
DATED : April 25, 2006
INVENTOR(S) : Jebu Jacob Rajan It is certified that error appears in the above-identified patent and that said Letters Patent is hereby corrected as shown below:

COLUMN 2

Line 14, "sion," should read --sion;--.

COLUMN 4

Lines 31-37,
$$e(n) = s(n) - a_1 s(n-1) - a_2 s(n-2) - \cdots - a_k s(n-k-1)$$
$$e(n-1) = s(n-1) - a_1 s(n-2) - a_2 s(n-3) - \cdots - a_k s(n-k-1)$$
$$e(n-N+1) = s(n-N+1) - a_1 s(n-N) - a_2 s(n-N-1) - \cdots$$
$$-a_i s(n-k-N1) \qquad (5)$$

should read $$--e(n) = s(n) - a_1 s(n-1) - a_2 s(n-2) - \cdots - a_k s(n-k)$$
$$e(n-1) = s(n-1) - a_1 s(n-2) - a_2 s(n-3) - \cdots - a_k s(n-k-1)$$
$$e(n-N+1) = s(n-N+1) - a_1 s(n-N) - a_2 s(n-N-1) - \cdots$$
$$-a_i s(n-k-N+1) \qquad (5)$$
--.

COLUMN 6

Lines 4-6,
$$p(s(n) | a, k\sigma_e^2) = p(\varepsilon(n)) \left| \frac{\partial \varepsilon(n)}{\partial s(n)} \right|_{\varepsilon(n)=s(n)-Sa}$$

should read $$-- p(s(n) | a, k, \sigma_e^2) = p(\varepsilon(n)) \left| \frac{\partial \varepsilon(n)}{\partial s(n)} \right|_{\varepsilon(n)=s(n)-Sa} --.$$

UNITED STATES PATENT AND TRADEMARK OFFICE
CERTIFICATE OF CORRECTION

PATENT NO. : 7,035,790 B2  
APPLICATION NO. : 09/866596  
DATED : April 25, 2006  
INVENTOR(S) : Jebu Jacob Rajan Page 3 of 6

It is certified that error appears in the above-identified patent and that said Letters Patent is hereby corrected as shown below:

COLUMN 7

Line 29, "$(\underline{a}_a),$" should read -- $(\underline{\sigma}_a^2),$ --;

Line 37, "$\underline{a}_a,$" should read -- $\underline{\mu}_a,$ --;

Line 38, "$p(\underline{a}_a))$" should read -- $p(\underline{\mu}_a))$ --;

Line 41, "$(\underline{a}_a)$" should read -- $\underline{\mu}_a$ --;

Line 44, "$p(\underline{a}_a)$" should read -- $p(\underline{\mu}_a)$ --; and

Line 45, "$\mu_a$" should read -- $\underline{\mu}_a$ --.

COLUMN 8

Line 15, "$(\underline{a}_h),$" should read -- $(\underline{\sigma}_h^2),$ --;

Line 23, "$p(\underline{a}_h))$" should read -- $p(\underline{\mu}_h))$ --;

Line 29, "$p(\underline{a}_h)$" should read -- $p(\underline{\mu}_h)$ --;

Line 30, "$\underline{a}_a$" should read -- $\underline{\mu}_a$ --;

Line 37, "$\alpha hd$" should read -- $d_h$ --; and

Line 67, "$\underline{h}, r, \sigma_a^2, \sigma_h^2, \sigma_e^2 . \underline{s}(n) | \underline{y}(n))$" should read -- $\underline{h}, r, \sigma_a^2, \sigma_h^2, \sigma_e^2 . \underline{s}(n) | \underline{y}(n)):$ --.

COLUMN 9

Line 9, "$p(a, k | \underline{h}^1, r^1, \sigma_a^{2^1}, \sigma_e^{2^1}, \sigma_h^{2^1}, \underline{s}(n)) \rightarrow a^2, k^2$" should read -- $p(a, k | \underline{h}^1, r^1, \sigma_a^{2^1}, \sigma_e^{2^1}, \sigma_h^{2^1}, \underline{s}(n)^1, )\underline{y}(n)) \rightarrow a^2, k^2$ --.

COLUMN 10

Line 20, "$a$" (both occurrences) should read -- $\underline{a}$ --.

UNITED STATES PATENT AND TRADEMARK OFFICE
CERTIFICATE OF CORRECTION

PATENT NO. : 7,035,790 B2
APPLICATION NO. : 09/866596
DATED : April 25, 2006
INVENTOR(S) : Jebu Jacob Rajan It is certified that error appears in the above-identified patent and that said Letters Patent is hereby corrected as shown below:

COLUMN 11

Lines 58-59, "$\hat{\alpha}_d = \frac{N}{2} + \alpha_a$ and $\hat{\beta}_a = \frac{2\beta_a}{2 + \beta_a \cdot (a + \underline{\mu}_a)^T (a - \underline{\mu}_a)}$ (29)" should read -- $\hat{\alpha}_d = \frac{N}{2} + \alpha_a$ and $\hat{\beta}_a = \frac{2\beta_a}{2 + \beta_a \cdot (a - \underline{\mu}_a)^T (a - \underline{\mu}_a)}$ (29) --.

COLUMN 12

Lines 3-4, "$\hat{\alpha}_h = \frac{N}{2} + \alpha_h$ and $\hat{\beta}_h = \frac{2\beta_h}{2 + \beta_h \cdot (a + \underline{\mu}_h)^T (a - \underline{\mu}_h)}$ (30)" should read -- $\hat{\alpha}_h = \frac{N}{2} + \alpha_h$ and $\hat{\beta}_h = \frac{2\beta_h}{2 + \beta_h \cdot (h - \underline{\mu}_h)^T (h - \underline{\mu}_h)}$ (30) --;

Line 8, "$(\underline{\sigma}_h^2)^g$ ." should read -- $(\underline{\sigma}_a^2)^g$ .--; and Lines 54-55 "$MO = \max \left\{ \frac{p(a_{<1:k_2>}, k_2 | \cdots)}{p(a_{<1:k_2>}, k_1 | \cdots)}, 1 \right\}$" should read -- $MO = \max \left\{ \frac{p(a_{<1:k_2>}, k_2 | \cdots)}{p(a_{<1:k_1>}, k_1 | \cdots)}, 1 \right\}$ --.

UNITED STATES PATENT AND TRADEMARK OFFICE
CERTIFICATE OF CORRECTION

PATENT NO. : 7,035,790 B2
APPLICATION NO. : 09/866596
DATED : April 25, 2006
INVENTOR(S) : Jebu Jacob Rajan It is certified that error appears in the above-identified patent and that said Letters Patent is hereby corrected as shown below:

COLUMN 13

Line 2, " $a$ " (third occurrence) should read -- $\underline{a}$ --;

Lines 59-64, "
$$\tilde{A} = \begin{bmatrix} a_1 & a_2 & a_3 & \cdots & a_J & 0 & \cdots & 0 \\ 1 & 0 & 0 & \cdots & 0 & 0 & \cdots & 0 \\ 0 & 1 & 0 & \cdots & 0 & 0 & \cdots & 0 \\ \vdots & & & \ddots & & & & \\ 0 & & & & & 1 & 0 \end{bmatrix}_{r \times r}$$
" should read --
$$\tilde{A} = \begin{bmatrix} a_1 & a_2 & a_3 & \cdots & a_k & 0 & \cdots & 0 \\ 1 & 0 & 0 & \cdots & 0 & 0 & \cdots & 0 \\ 0 & 1 & 0 & \cdots & 0 & 0 & \cdots & 0 \\ \vdots & & & \ddots & & & & \\ 0 & & & & & 1 & 0 \end{bmatrix}_{r \times r}$$
--.

COLUMN 14

Line 26, "equal" should read --equal to--.

COLUMN 15

Line 11, " $\underline{a}(t) \sim N(0, C(t))$ " should read -- $\underline{n}(t) \sim N(0, C(t))$ --;

Line 15, " $\underline{r}(t-1) = \underline{h}d(t)^{-1}w(t) + L(t)^T \underline{r}(t) - V(t)^T C(t)^{-1} \underline{a}(t)$ " should read -- $\underline{r}(t-1) = \underline{h}d(t)^{-1}w(t) + L(t)^T \underline{r}(t) - V(t)^T C(t)^{-1} \underline{n}(t)$ --;

Lines 19-20, " $\tilde{e}(t) = \alpha_e^2 \underline{r}(t) + \underline{a}(t)$ where
$$\tilde{e}(t) = [\tilde{e}(t)\tilde{e}(t-1)\tilde{e}(t-2) \cdots \tilde{e}(t-r+1)]^T$$
"

should read

-- $\tilde{e}(t) = \alpha_e^2 \underline{r}(t) + \underline{n}(t)$ where
$$\tilde{e}(t) = [\tilde{e}(t)\tilde{e}(t-1)\tilde{e}(t-2) \cdots \tilde{e}(t-r+1)]^T$$
--; and Line 24, " $\underline{a}(t)$ " should read -- $\underline{n}(t)$ --.

UNITED STATES PATENT AND TRADEMARK OFFICE
CERTIFICATE OF CORRECTION

PATENT NO.       : 7,035,790 B2
APPLICATION NO.  : 09/866596
DATED            : April 25, 2006
INVENTOR(S)      : Jebu Jacob Rajan It is certified that error appears in the above-identified patent and that said Letters Patent is hereby corrected as shown below:

COLUMN 20

Line 58, "the" (first occurrence) should be deleted.

COLUMN 29

Line 61, "mode" should read --model--.

COLUMN 33

Line 16, "speech" should read --a speech--.

Signed and Sealed this

Twentieth Day of March, 2007

JON W. DUDAS
*Director of the United States Patent and Trademark Office*